US011955081B2

(12) United States Patent
Lee et al.

(10) Patent No.: US 11,955,081 B2
(45) Date of Patent: Apr. 9, 2024

(54) PIXEL OF AN ORGANIC LIGHT EMITTING DIODE DISPLAY DEVICE, AND ORGANIC LIGHT EMITTING DIODE DISPLAY DEVICE

(71) Applicant: Samsung Display Co., Ltd., Yongin-si (KR)

(72) Inventors: Hyo Jin Lee, Yongin-si (KR); Joon-Chul Goh, Suwon-si (KR); Sangan Kwon, Cheonan-si (KR); Hong Soo Kim, Hwaseong-si (KR); Hui Nam, Suwon-si (KR); Jin Young Roh, Hwaseong-si (KR); Sehyuk Park, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 101 days.

(21) Appl. No.: 16/988,643

(22) Filed: Aug. 8, 2020

(65) Prior Publication Data

US 2021/0074217 A1 Mar. 11, 2021

(30) Foreign Application Priority Data

Sep. 5, 2019 (KR) ........................ 10-2019-0110004

(51) Int. Cl.
*G09G 3/3258* (2016.01)
*G09G 3/3266* (2016.01)
*G09G 3/3291* (2016.01)

(52) U.S. Cl.
CPC ......... *G09G 3/3258* (2013.01); *G09G 3/3266* (2013.01); *G09G 3/3291* (2013.01);
(Continued)

(58) Field of Classification Search
CPC ............... G09G 3/3258; G09G 3/3266; G09G 2300/0842; G09G 2330/021;
(Continued)

(56) References Cited

U.S. PATENT DOCUMENTS

2010/0148825 A1* 6/2010 Park .................... H01L 27/1251 257/E27.06
2013/0126873 A1* 5/2013 Yang ................. H01L 29/78648 257/66
(Continued)

FOREIGN PATENT DOCUMENTS

KR 10-2017-0080793 A 7/2017

*Primary Examiner* — Roberto W Flores
(74) *Attorney, Agent, or Firm* — Lewis Roca Rothgerber Christie LLP

(57) ABSTRACT

A pixel includes: a storage capacitor connected between a first power supply voltage and a gate node; a first transistor including a gate electrode connected to the gate node; a second transistor to transfer a data signal to a source of the first transistor in response to a scan signal; a third transistor to diode-connect the first transistor in response to the scan signal, and including first and second sub-transistors serially connected between the gate node and a drain of the first transistor; a fourth transistor to transfer an initialization voltage to the gate node in response to an initialization signal, and including third and fourth sub-transistors serially connected between the gate node and the initialization voltage; and an organic light emitting diode including a cathode connected to a second power supply voltage. At least one of the second and fourth sub-transistors includes a bottom electrode.

20 Claims, 15 Drawing Sheets

(52) U.S. Cl.
CPC ............... *G09G 2300/0842* (2013.01); *G09G 2330/021* (2013.01)

(58) Field of Classification Search
CPC ......... G09G 2320/103; G09G 2310/04; G09G 2320/0686; G09G 3/2092; G09G 2300/0426; G09G 3/325; G09G 3/3233; G09G 2300/0819; G09G 2300/0814; G09G 2300/0861; G09G 2320/0219; G09G 2320/02; G09G 2340/0435; G09G 2300/0439; G09G 2300/0809; G09G 3/3208–3291; H01L 27/3262; H10K 59/121–127
See application file for complete search history.

(56) References Cited

U.S. PATENT DOCUMENTS

| | | | | |
|---|---|---|---|---|
| 2017/0110049 | A1* | 4/2017 | Choi | G09G 3/2092 |
| 2017/0117343 | A1* | 4/2017 | Oh | H01L 27/3262 |
| 2017/0193890 | A1 | 7/2017 | Kim et al. | |
| 2017/0287996 | A1* | 10/2017 | Kim | H01L 27/3265 |
| 2018/0212014 | A1* | 7/2018 | Choi | G09G 3/3233 |
| 2019/0057648 | A1* | 2/2019 | Xu | G09G 3/3275 |
| 2021/0005137 | A1* | 1/2021 | Toyomura | G09G 3/3233 |
| 2021/0043709 | A1* | 2/2021 | Kim | G09G 3/3233 |
| 2021/0280146 | A1* | 9/2021 | Kawashima | G09G 3/3275 |
| 2021/0313355 | A1* | 10/2021 | Yamazaki | H10K 59/86 |

* cited by examiner

PIXEL OF AN ORGANIC LIGHT EMITTING DIODE DISPLAY DEVICE, AND ORGANIC LIGHT EMITTING DIODE DISPLAY DEVICE

CROSS-REFERENCE TO RELATED APPLICATION

This application claims priority to and the benefit of Korean Patent Application No. 10-2019-0110004, filed on Sep. 5, 2019 in the Korean Intellectual Property Office (KIPO), the entire content of which is incorporated herein by reference.

BACKGROUND

1. Field

Aspects of example embodiments of the present inventive concept relate to a display device, and more particularly, to a pixel of an organic light emitting diode display device, and the organic light emitting diode display device.

2. Description of the Related Art

Reduction of power consumption may be desirable in an organic light emitting diode (OLED) display device that is employed in a portable device, such as a smartphone, a tablet computer, and the like. Recently, in order to reduce the power consumption of the OLED display device, a low frequency driving technique, which decreases a driving frequency when displaying a still image, has been developed. For example, when performing low frequency driving, the OLED display device may not drive a display panel at one or more frames, and the display panel may display an image based on stored data signals, thereby reducing the power consumption.

However, while the display panel displays an image based on the stored data signals, the stored data signals may be distorted by leakage currents of transistors included in pixels of the display panel, and thus, an image quality of the OLED display device may be degraded.

The above information disclosed in this Background section is for enhancement of understanding of the background of the inventive concept, and therefore, it may contain information that does not constitute prior art.

SUMMARY

One or more example embodiments of the present inventive concept are directed to a pixel of an organic light emitting diode display device that is capable of preventing or reducing an image quality degradation at low frequency driving.

One or more example embodiments of the present inventive concept are directed to an organic light emitting diode display device capable of preventing or reducing an image quality degradation at low frequency driving.

According to one or more example embodiments of the present inventive concept, a pixel of an organic light emitting diode display device, includes: a storage capacitor including a first electrode connected to a line of a first power supply voltage, and a second electrode connected to a gate node; a first transistor including a gate electrode connected to the gate node; a second transistor configured to transfer a data signal to a source of the first transistor in response to a scan signal; a third transistor configured to diode-connect the first transistor in response to the scan signal, the third transistor including first and second sub-transistors serially connected between the gate node and a drain of the first transistor; a fourth transistor configured to transfer an initialization voltage to the gate node in response to an initialization signal, the fourth transistor including third and fourth sub-transistors serially connected between the gate node and a line of the initialization voltage; and an organic light emitting diode comprising an anode, and a cathode connected to a line of a second power supply voltage. At least one of the second sub-transistor and the fourth sub-transistor includes a bottom electrode.

In an example embodiment, the fourth transistor may include: a first gate electrode of the third sub-transistor configured to receive the initialization signal; a first source of the third sub-transistor connected to the gate node; a second gate electrode of the fourth sub-transistor configured to receive the initialization signal; a second drain of the fourth sub-transistor connected to the line of the initialization voltage; a node of the fourth transistor configured as a first drain of the third sub-transistor and a second source of the fourth sub-transistor; and the bottom electrode located under the second gate electrode of the fourth sub-transistor.

In an example embodiment, the bottom electrode of the fourth transistor may be configured to receive a bottom electrode voltage during a masking period in which a display panel of the organic light emitting diode display device is not driven.

In an example embodiment, the bottom electrode voltage may have a positive voltage level during the masking period.

In an example embodiment, an off-current of the fourth sub-transistor may be increased according to the bottom electrode voltage having the positive voltage level, and the off-current of the fourth sub-transistor may flow from the node of the fourth transistor to the line of the initialization voltage during the masking period.

In an example embodiment, the bottom electrode voltage may have a negative voltage level during the masking period.

In an example embodiment, the fourth sub-transistor may be configured to turned on according to the bottom electrode voltage having the negative voltage level, and an on-current of the fourth sub-transistor may flow from the node of the fourth transistor to the line of the initialization voltage.

In an example embodiment, the third transistor may include: a first gate electrode of the first sub-transistor configured to receive the scan signal; a first source of the first sub-transistor connected to the gate node; a second gate electrode of the second sub-transistor configured to receive the scan signal; a second drain of the second sub-transistor connected to the drain of the first transistor; a node of the third transistor configured as a first drain of the first sub-transistor and a second source of the second sub-transistor; and the bottom electrode located under the second gate electrode of the second sub-transistor.

In an example embodiment, the bottom electrode of the third transistor may be configured to receive a bottom electrode voltage during a masking period in which a display panel of the organic light emitting diode display device is not driven.

In an example embodiment, the bottom electrode voltage may have a positive voltage level during the masking period.

In an example embodiment, an off-current of the second sub-transistor may be increased according to the bottom electrode voltage having the positive voltage level, and the off-current of the second sub-transistor may flow from the node of the third transistor to the drain of the first transistor during the masking period.

In an example embodiment, the bottom electrode voltage may have a negative voltage level during the masking period.

In an example embodiment, the second sub-transistor may be configured to turned on according to the bottom electrode voltage having the negative voltage level, and an on-current of the second sub-transistor may flow from the node of the third transistor to the drain of the first transistor.

In an example embodiment, each of the second sub-transistor and the fourth sub-transistor may include the bottom electrode.

In an example embodiment, the pixel may further include: a fifth transistor including a gate electrode configured to receive an emission signal, a source connected to the line of the first power supply voltage, and a drain connected to the source of the first transistor; a sixth transistor including a gate electrode configured to receive the emission signal, a source connected to the drain of the first transistor, and a drain connected to the anode of the organic light emitting diode; and a seventh transistor including a gate electrode configured to receive the initialization signal, a source connected to the anode of the organic light emitting diode, and a drain connected to the line of the initialization voltage.

According to one or more example embodiments of the present inventive concept, an organic light emitting diode (OLED) display device includes: a display panel including a plurality of pixels; a data driver configured to provide data signals to the plurality of pixels; a scan driver configured to provide scan signals and initialization signals to the plurality of pixels; a power supply configured to provide a first power supply voltage, a second power supply voltage, and an initialization voltage to the plurality of pixels; and a controller configured to control the data driver, the scan driver, and the power supply. Each of the plurality of pixels includes: a storage capacitor including a first electrode connected to a line of the first power supply voltage, and a second electrode connected to a gate node; a first transistor including a gate electrode connected to the gate node; a second transistor configured to transfer a corresponding one of the data signals to a source of the first transistor in response to a corresponding one of the scan signals; a third transistor configured to diode-connect the first transistor in response to the corresponding one of the scan signals, the third transistor including first and second sub-transistors that are serially connected between the gate node and a drain of the first transistor; a fourth transistor configured to transfer the initialization voltage to the gate node in response to a corresponding one of the initialization signals, the fourth transistor including third and fourth sub-transistors that are serially connected between the gate node and a line of the initialization voltage; and an organic light emitting diode including an anode, and a cathode connected to a line of the second power supply voltage. At least one of the second sub-transistor and the fourth sub-transistor includes a bottom electrode.

In an example embodiment, the controller may include: a still image detector configured to receive input image data at an input frame frequency, and to determine whether the input image data represents a still image, and when the input image data represents the still image, the controller may be configured to set at least one frame period as a masking period to drive the display panel at a driving frequency lower than the input frame frequency.

In an example embodiment, the data driver may be configured to not provide the data signals to the plurality of pixels during the masking period, the scan driver may be configured to not provide the scan signals to the plurality of pixels during the masking period, and the power supply may be configured to provide a bottom electrode voltage to the bottom electrode of each of the plurality of pixels during the masking period.

In an example embodiment, the controller may include: a still image detector configured to receive input image data at an input frame frequency, to divide the input image data into a plurality of partial image data, and to determine whether each of the plurality of partial image data represents a still image. When at least one partial image data of the plurality of partial image data represents the still image, the controller may be configured to set a portion of a frame period corresponding to a portion of the display panel as a masking period to drive the portion of the display panel corresponding to the at least one partial image data at a driving frequency lower than the input frame frequency. The power supply may be configured to provide a bottom electrode voltage to the bottom electrode of each of the plurality of pixels during the masking period.

In an example embodiment, the display panel may include a plurality of regions, and the power supply may be configured to provide different bottom electrode voltages to the plurality of regions during a masking period.

According to one or more example embodiments of the present inventive concept, a third transistor (e.g., a threshold voltage compensating transistor) of a pixel may include first and second sub-transistors that are serially connected between a gate node and a drain of a first transistor of the pixel, a fourth transistor (e.g., a gate initializing transistor) of the pixel may include third and fourth sub-transistors that are serially connected between the gate node and a line of an initialization voltage, and at least one from among the second sub-transistor and the fourth sub-transistor may include a bottom electrode. In some example embodiments, the bottom electrode may receive a bottom electrode voltage that is a positive voltage or a negative voltage during a masking period in which a display panel is not driven. Accordingly, a voltage distortion of the gate node at low frequency driving may be compensated, and an image quality of the organic light emitting diode display device may be improved.

BRIEF DESCRIPTION OF THE DRAWINGS

The above and other aspects and features of the present inventive concept will become more apparent to those skilled in the art from the following detailed description of the example embodiments with reference to the accompanying drawings.

DETAILED DESCRIPTION

Figure 1:
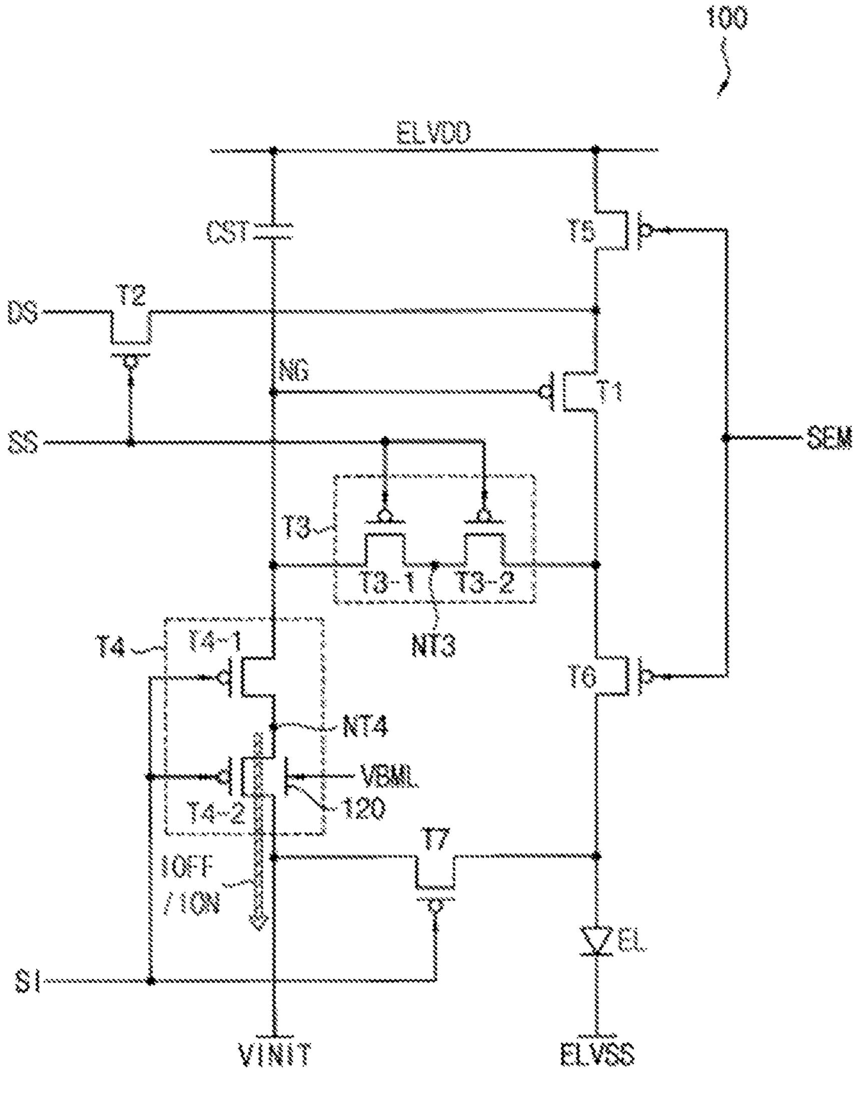
FIG. 1 is a circuit diagram illustrating a pixel of an organic light emitting diode display device according to one or more example embodiments.

Hereinafter, example embodiments will be described in more detail with reference to the accompanying drawings. The present inventive concept, however, may be embodied in various different forms, and should not be construed as being limited to only the illustrated embodiments herein. Rather, these embodiments are provided as examples so that this disclosure will be thorough and complete, and will fully convey the aspects and features of the inventive concept to those skilled in the art. Accordingly, processes, elements, and techniques that are not necessary to those having ordinary skill in the art for a complete understanding of the aspects and features of the inventive concept may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the inventive concept.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
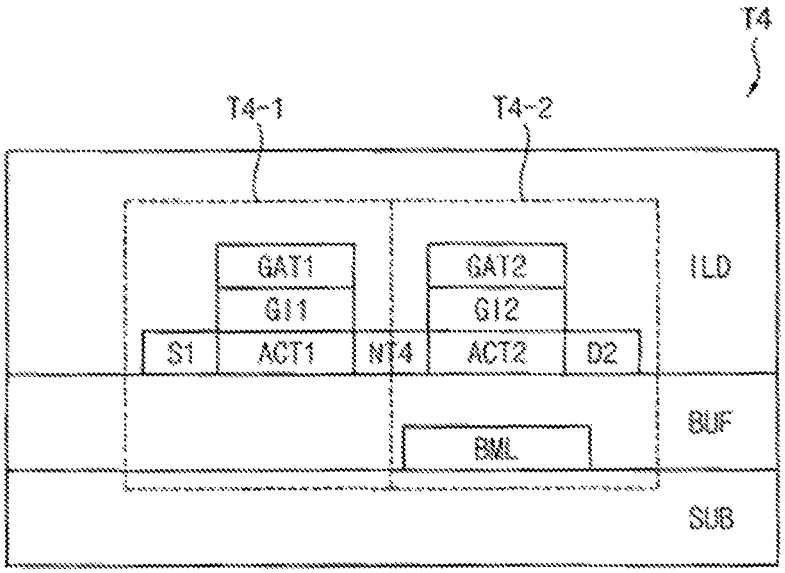
FIG. 2 is a cross-sectional diagram illustrating an example of a fourth transistor (or a third transistor) included in a pixel of an organic light emitting diode display device according to one or more example embodiments.
Figure 3:
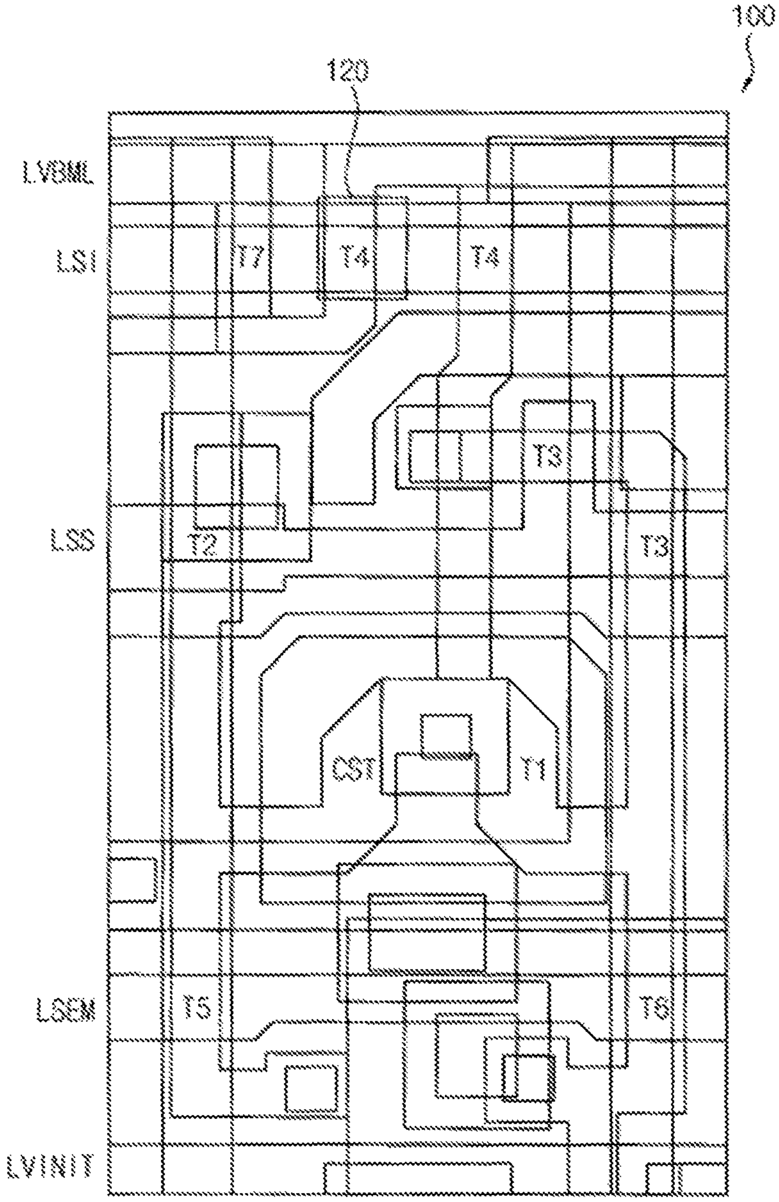
FIG. 3 is a diagram illustrating an example of a layout of the pixel of FIG. 1.

FIG. 1 is a circuit diagram illustrating a pixel of an organic light emitting diode display device according to one or more example embodiments, FIG. 2 is a cross-sectional diagram illustrating an example of a fourth transistor (or a third transistor) included in a pixel of an organic light emitting diode display device according to one or more example embodiments, and FIG. 3 is a diagram illustrating an example of a layout of the pixel of FIG. 1.

Referring to FIG. 1, a pixel 100 of an organic light emitting diode display device according to one or more example embodiments may include a storage capacitor CST, a first transistor T1, a second transistor T2, a third transistor T3, a fourth transistor T4, and an organic light emitting diode EL. In some example embodiments, the pixel 100 may further include a fifth transistor T5, a sixth transistor T6, and a seventh transistor T7.

The storage capacitor CST may store a data signal DS transferred through the second transistor T2 and the first transistor T1, which may be diode-connected (e.g., by the third transistor T3) as described below. In some example embodiments, the storage capacitor CST may have a first electrode connected to a line of a first power supply voltage ELVDD, and a second electrode connected to a gate node NG.

The first transistor T1 may generate a driving current according to (e.g., based on) the data signal DS stored in the storage capacitor CST (e.g., or a voltage of the gate node NG). The first transistor T1 may be referred to as a driving transistor. In some example embodiments, the first transistor T1 may have a gate electrode connected to the second electrode of the storage capacitor CST (e.g., at the gate node NG), a source connected to the line of the first power supply voltage ELVDD, and a drain connected to a source of the sixth transistor T6.

The second transistor T2 may transfer the data signal DS to the source of the first transistor T1 in response to a scan signal SS. The second transistor T2 may be referred to as a switching transistor or a scan transistor. In some example embodiments, the second transistor T2 may have a gate electrode for receiving the scan signal SS, a source for receiving the data signal DS, and a drain connected to the source of the first transistor T1.

The third transistor T3 may diode-connect the first transistor T1 in response to the scan signal SS. The third transistor T3 may be referred to as a threshold voltage compensating transistor. In some example embodiments, the third transistor T3 may have a gate electrode for receiving the scan signal SS, a drain (e.g., a second drain of a second sub-transistor T3-2) connected to the drain of the first transistor T1, and a source (e.g., a first source of a first sub-transistor T3-1) connected to the gate electrode of the first transistor T1 (e.g., at the gate node NG). While the scan signal SS is applied, the data signal DS transferred by the second transistor T2 may be stored in the storage capacitor CST through the first transistor T1 that is diode-connected by the third transistor T3. Accordingly, the storage capacitor CST may store the data signal DS where a threshold voltage of the first transistor T1 is compensated.

The fourth transistor T4 may transfer an initialization voltage VINIT to the gate node NG in response to an initialization signal SI. The fourth transistor T4 may be referred to as a gate initializing transistor. In some example embodiments, the fourth transistor T4 may include a gate electrode for receiving the initialization signal SI, a source (e.g., a first source of a third sub-transistor T4-1) connected to the gate node NG, and a drain (e.g., a second drain of a fourth sub-transistor T4-2) connected to a line of the initialization voltage VINIT. While the initialization signal SI is applied, the fourth transistor T4 may initialize the gate node NG (e.g., the storage capacitor CST and the gate electrode of the first transistor T1) by using the initialization voltage VINIT.

The fifth transistor T5 may connect the line of the first power supply voltage ELVDD to the source of the first transistor T1 in response to an emission signal SEM. The fifth transistor T5 may be referred to as a first emission transistor. In some example embodiments, the fifth transistor T5 may include a gate electrode for receiving the emission signal SEM, a source connected to the line of the first power supply voltage ELVDD, and a drain connected to the source of the first transistor T1.

The sixth transistor T6 may connect the drain of the first transistor T1 to an anode of the organic light emitting diode EL in response to the emission signal SEM. The sixth transistor T6 may be referred to as a second emission transistor. In some example embodiments, the sixth transistor T6 may include a gate electrode for receiving the emission signal SEM, a source connected to the drain of the first transistor T1, and a drain connected to the anode of the organic light emitting diode EL. While the emission signal SEM is applied, the fifth and sixth transistors T5 and T6 may be turned on, and a path of the driving current from the line of the first power supply voltage ELVDD to a line of a second power supply voltage ELVSS may be formed.

The seventh transistor T7 may transfer the initialization voltage VINIT to the anode of the organic light emitting diode EL in response to the initialization signal SI. The seventh transistor T7 may be referred to as a diode initializing transistor. In some example embodiments, the seventh transistor T7 may include a gate electrode for receiving the initialization signal SI, a source connected to the anode of the organic light emitting diode EL, and a drain connected to the line of the initialization voltage VINIT. While the initialization signal SI is applied, the seventh transistor T7 may initialize the organic light emitting diode EL by using the initialization voltage VINIT.

The organic light emitting diode EL may emit light according to (e.g., based on) the driving current generated by the first transistor T1. In some example embodiments, the organic light emitting diode EL may have the anode connected to the drain of the sixth transistor T6, and a cathode connected to the line of the second power supply voltage ELVSS. While the emission signal SEM is applied, the driving current generated by the first transistor T1 may be provided to the organic light emitting diode EL, and the organic light emitting diode EL may emit light according to (e.g., based on) the driving current.

To reduce power consumption, the organic light emitting diode display device including the pixel 100 may perform low frequency driving, for example, when a still image is displayed. When the low frequency driving is performed, each pixel 100 may not receive the initialization signal SI, the scan signal SS, and the data signal DS during at least a portion of a plurality of frame periods, and may emit light according to (e.g., based on) the data signal DS that is stored in the storage capacitor CST during a previous frame period. In this case, the data signal DS stored in the storage capacitor CST (e.g., or a voltage of the gate node NG) may be distorted by a leakage current of the transistors T1 through T7 of the pixel 100 (e.g., by a leakage current of the third and fourth transistors T3 and T4), and thus, an image quality of the organic light emitting diode display device may be degraded.

In some example embodiments, to reduce the leakage current of the third and fourth transistors T3 and T4, each of the third and fourth transistors T3 and T4 may have a dual transistor structure. For example, as illustrated in FIG. 1, the third transistor T3 may include first and second sub-transistors T3-1 and T3-2 that are serially connected between the gate node NG and the drain of the first transistor T1, and the fourth transistor T4 may include third and fourth sub-transistors T4-1 and T4-2 that are serially connected between the gate node NG and the line of the initialization voltage VINIT. In the case where the third transistor T3 includes the first and second sub-transistors T3-1 and T3-2, the leakage current of the third transistor T3 from the drain of the first transistor T1 to the gate node NG may be reduced. Further, in the case where the fourth transistor T4 includes the third and fourth sub-transistors T4-1 and T4-2, the leakage current of the fourth transistor T4 from the line of the initialization voltage VINIT to the gate node NG may be reduced.

However, even if the third transistor T3 includes the first and second sub-transistors T3-1 and T3-2, a parasitic capacitor may be formed between a node NT3 of the third transistor T3 and a line (e.g., a line of the scan signal SS) of the pixel 100, and thus, a leakage current of the first sub-transistor T3-1 from the node NT3 of the third transistor T3 to the gate node NG may occur. Further, even if the fourth transistor T4 includes the third and fourth sub-transistors T4-1 and T4-2, a parasitic capacitor may be formed between a node NT4 of the fourth transistor T4 and a line (e.g., a line of the initialization signal SI) of the pixel 100, and thus, a leakage current of the third sub-transistor T4-1 from the node NT4 of the fourth transistor T4 to the gate node NG may occur. Accordingly, the voltage of the gate node NG may be increased, and the driving current of the first transistor T1 may be reduced, and thus, luminance of the organic light emitting diode EL may be reduced.

According to one or more example embodiments, to compensate for the voltage distortion of the gate node NG by the leakage currents of the first sub-transistor T3-1 and the third sub-transistor T4-1, the fourth sub-transistor T4-2 of the pixel 100 may include a bottom electrode 120. In some example embodiments, the bottom electrode 120 may be referred to as a bottom metal layer (BML).

In some example embodiments, as illustrated in FIGS. 1 and 2, the fourth transistor T4 may include a first gate electrode GAT1 of the third sub-transistor T4-1, a first source S1 of the third sub-transistor T4-1, a second gate electrode GAT2 of the fourth sub-transistor T4-2, a second drain D2 of the fourth sub-transistor T4-2, and the node NT4. The first gate electrode GAT1 of the third sub-transistor T4-1 may receive the initialization signal SI, and the first source S1 of the third sub-transistor T4-1 may be connected to the gate node NG. The second gate electrode GAT2 of the fourth sub-transistor T4-2 may receive the initialization signal SI, and the second drain D2 of the fourth sub-transistor T4-2 may be connected to the line of the initialization voltage VINIT. The node NT4 of the fourth transistor T4 may serve as a first drain of the third sub-transistor T4-1 and a second source of the fourth sub-transistor T4-2, and the bottom electrode 120 (e.g., the BML) may be disposed under the second gate electrode GAT2 of the fourth sub-transistor T4-2.

For example, as illustrated in FIG. 2, the bottom electrode 120 (e.g., the BML) may be formed on a substrate SUB, for example, such as a glass substrate or a polyimide (PI) substrate, to overlap with the second gate GAT2. In some example embodiments, the bottom electrode 120 (e.g., the BML) may include molybdenum (Mo), but the present inventive concept is not limited thereto. In other example embodiments, the bottom electrode 120 (e.g., the BML) may include a low resistance opaque conductive material, for example, such as aluminium (Al), Al alloy, tungsten (W), copper (Cu), nickel (Ni), chromium (Cr), titanium (Ti), platinum (Pt), tantalum (Ta), and/or the like. A buffer layer BUF for blocking an impurity of the substrate SUB may be formed on the bottom electrode 120 (e.g., the BML). The first source S1, a first active region ACT1, the node NT4 of the fourth transistor T4, a second active region ACT2, and the second drain D2 may be formed on the buffer layer BUF. First and second gate insulating layers Gil and GI2 may be formed on the first and second active regions ACT1 and ACT2. The first and second gate electrodes GAT1 and GAT2 may be formed on the first and second gate insulating layers Gil and GI2. The second gate electrode GAT2 may be formed to overlap with the bottom electrode 120 (e.g., the BML). An interlayer insulating layer ILD may be formed on the buffer layer BUF. Accordingly, the fourth transistor T4 may include the third sub-transistor T4-1 including the first source S1, the node NT4 serving as the first drain, and the first gate electrode GAT1, and the fourth sub-transistor T4-2 including the node NT4 serving as the second source, the second drain D2, the second gate electrode GAT2, and the bottom electrode 120 (e.g., the BML), and the bottom electrode 120 (e.g., the BML) may be disposed to overlap with the second gate electrode GAT2.

Further, for example, as illustrated in FIG. 3, the pixel 100 may include the storage capacitor CST and the first through seventh transistors T1 through T7. The fourth sub-transistor T4-2 of the fourth transistor T4 may include the bottom electrode 120. Further, the pixel 100 may be connected to an initialization signal line LSI, a scan signal line LSS, an emission signal line LSEM, an initialization voltage line LVINIT, and a bottom electrode voltage line LVBML. In some example embodiments, the bottom electrode 120 of the fourth sub-transistor T4-2 may be connected to the bottom electrode voltage line LVBML, and may receive a bottom electrode voltage VBML.

In the pixel 100 of the organic light emitting diode display device according to one or more example embodiments, when the low frequency driving is performed, for example, during a masking period in which a display panel is not driven, the bottom electrode 120 of the fourth sub-transistor T4-2 may receive the bottom electrode voltage VBML through the bottom electrode voltage line LVBML. The bottom electrode 120 of the fourth sub-transistor T4-2 may provide an off-current IOFF or an on-current ION from the node NT4 of the fourth transistor T4 to the line LVINIT of the initialization voltage VINIT according to (e.g., based on) the bottom electrode voltage VBML. Accordingly, the leakage current from the node NT4 of the fourth transistor T4 to the gate node NG may be prevented or reduced, and the voltage distortion of the gate node NG may be compensated.

Figure 4:
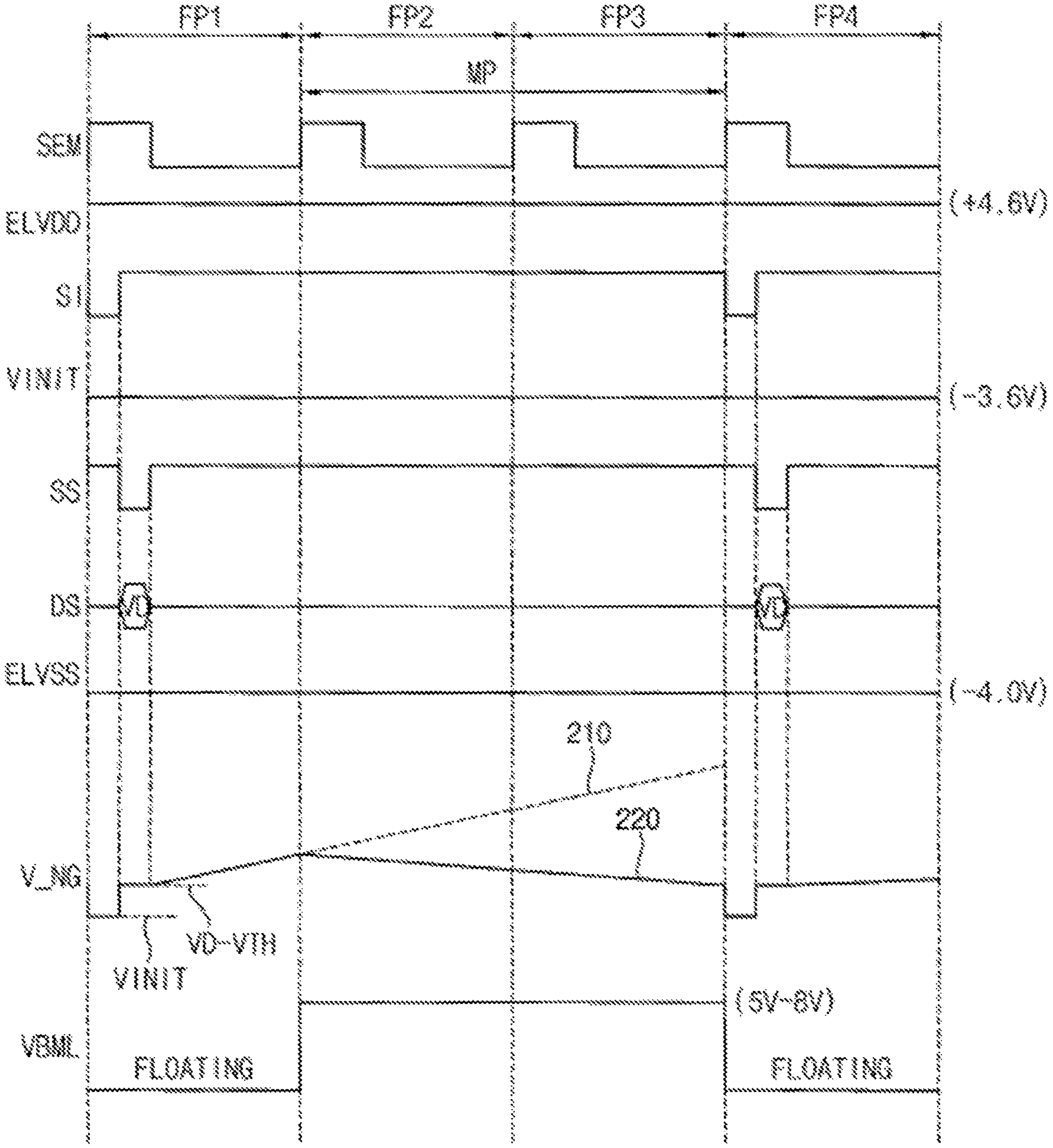
FIG. 4 is a timing diagram illustrating an example of an operation of a pixel of an organic light emitting diode display device according to one or more example embodiments.

FIG. 4 is a timing diagram illustrating an example of an operation of a pixel of an organic light emitting diode display device according to one or more example embodiments.

Referring to FIGS. 1 and 4, the organic light emitting diode display device including the pixel 100 may perform low frequency driving, for example, such as when a still image is displayed. In the case where the low frequency driving is performed, even though input image data may be received at an input frame frequency, the organic light emitting diode display device may drive a display panel at a driving frequency lower than the input frame frequency. For example, in a case where the input frame frequency is about 60 Hz and the driving frequency is about 20 Hz, the organic light emitting diode display device may set two frame periods (e.g., second and third frame periods FP2 and FP3) from among three frame periods (e.g., first, second, and third frame periods FP1, FP2, and FP3) as a masking period MP, may provide an initialization signal SI, a scan signal SS, and a data signal DS to each pixel 100 during the other remaining period (e.g., during the first frame period FP1), and may not provide the initialization signal SI, the scan signal SS, and the data signal DS to each pixel 100 during the masking period MP (e.g., during the second and third frame periods FP2 and FP3). Thereafter, during a subsequent frame period (e.g., during a fourth frame period FP4), the initialization signal SI, the scan signal SS, and the data signal DS may be provided to each pixel 100. Further, for example, the organic light emitting diode display device may provide a first power supply voltage ELVDD (e.g., of or equal to about 4.6V), an initialization voltage VINIT (e.g., of or equal to about −3.6V), and a second power supply voltage ELVSS (e.g., of or equal to about −3.6V) to each pixel 100, and may provide an emission signal SEM to each pixel 100 at the input frame frequency.

In more detail, during the first frame period FP1, the pixel 100 may receive the emission signal SEM having an off level (e.g., a high level), and may sequentially receive the initialization signal SI and the scan signal SS (e.g., having an on level, such as a low level) while the emission signal SEM has the off level. While the initialization signal SI is received, the fourth and seventh transistors T4 and T7 may be turned on, the fourth transistor T4 may initialize the gate node NG by using the initialization voltage VINIT, and the seventh transistor T7 may initialize the organic light emitting diode EL by using the initialization voltage VINIT. A voltage V_NG of the gate node NG may become the same or substantially the same as the initialization voltage VINIT transferred through the fourth transistor T4. While the scan signal SS is received, a data voltage VD may be applied to the pixel 100 as the data signal DS, and the second and third transistors T2 and T3 may be turned on. The second transistor T2 may transfer the data voltage VD to the source of the first transistor T1, and the third transistor T3 may diode-connect the first transistor T1. In this case, the data voltage VD may be transferred to the gate node NG through the diode-connected first transistor T1. Because the data voltage VD is transferred through the diode-connected first transistor T1, the voltage V_NG of the gate node NG may become a voltage VD-VTH corresponding to a difference between the data voltage VD and the threshold voltage VTH of the first transistor T1 (e.g., a voltage resulting from the threshold voltage VTH of the first transistor T1 subtracted from the data voltage VD).

When the emission signal SEM is changed from the off level (e.g., the high level) to an on level (e.g., a low level), the fifth and sixth transistors T5 and T6 may be turned on, the first transistor T1 may generate a driving current according to (e.g., based on) the voltage V_NG of the gate node NG (e.g., the voltage VD-VTH corresponding to the difference between the data voltage VD and the threshold voltage VTH of the first transistor T1), and the organic light emitting diode EL may emit light according to (e.g., based on) the driving current. Further, when the emission signal SEM is changed from the off level to the on level, the scan signal SS and the initialization signal SI are applied with an off level (e.g., a high level) to turn off the third and fourth transistor T3 and T4. While the third and fourth transistors T3 and T4 are turned off in response to the scan signal SS and the initialization signal SI having the off level, leakage currents of the third and fourth transistors T3 and T4 may flow to the gate node NG, and the voltage V_NG of the gate node NG may be increased. Thus, the driving current may be reduced according to (e.g., based on) the increased voltage V_NG of the gate node NG.

Further, in a case where a bottom electrode voltage VBML is not applied to a bottom electrode 120, during the masking period MP in which a display panel is not driven, for example, during the second and third frame periods FP2 and FP3, the voltage V_NG of the gate node NG may be further increased as illustrated as a dashed line 210 of FIG. 4. Accordingly, the driving current of the first transistor T1 may be further reduced, and thus, luminance of the pixel 100 may be further degraded.

However, in the pixel 100 according to one or more example embodiments, the bottom electrode 120 of the fourth sub-transistor T4-2 of the fourth transistor T4 may receive the bottom electrode voltage VBML during the masking period MP in which the display panel of the organic light emitting diode display device is not driven. Further, in some example embodiments, the bottom electrode voltage VBML may have a positive voltage level during the masking period MP. For example, the bottom electrode voltage VBML may be in a range from about 5V to about 8V, but the present inventive concept is not limited thereto. The bottom electrode voltage VBML may serve as a body voltage of the fourth sub-transistor T4-2, and thus, an off-current IOFF of the fourth sub-transistor T4-2 may be increased according to (e.g., based on) the bottom electrode voltage VBML having the positive voltage level. Accordingly, during the masking period MP (e.g., during the second and third frame periods FP2 and FP3), the off-current IOFF of the fourth sub-transistor T4-2 may flow from the node NT4 of the fourth transistor T4 to the line of the initialization voltage VINIT, and a voltage of the node NT4 of the fourth transistor T4 may be decreased. Accordingly, the voltage V_NG of the gate node NG may also be decreased as illustrated as a solid line 220 of FIG. 4. Therefore, during the masking period MP, a distortion of the voltage V_NG of the gate node NG may be compensated, and the luminance degradation of the pixel 100 may be compensated, and thus, an image quality of the organic light emitting diode display device may be improved. In some example embodiments, before or after the masking period MP, the bottom electrode voltage VBML may not be applied to the line of the bottom electrode voltage VBML, or the line of the bottom electrode voltage VBML may be in a floating state FLOATING, but the present inventive concept is not limited thereto.

Figure 5:
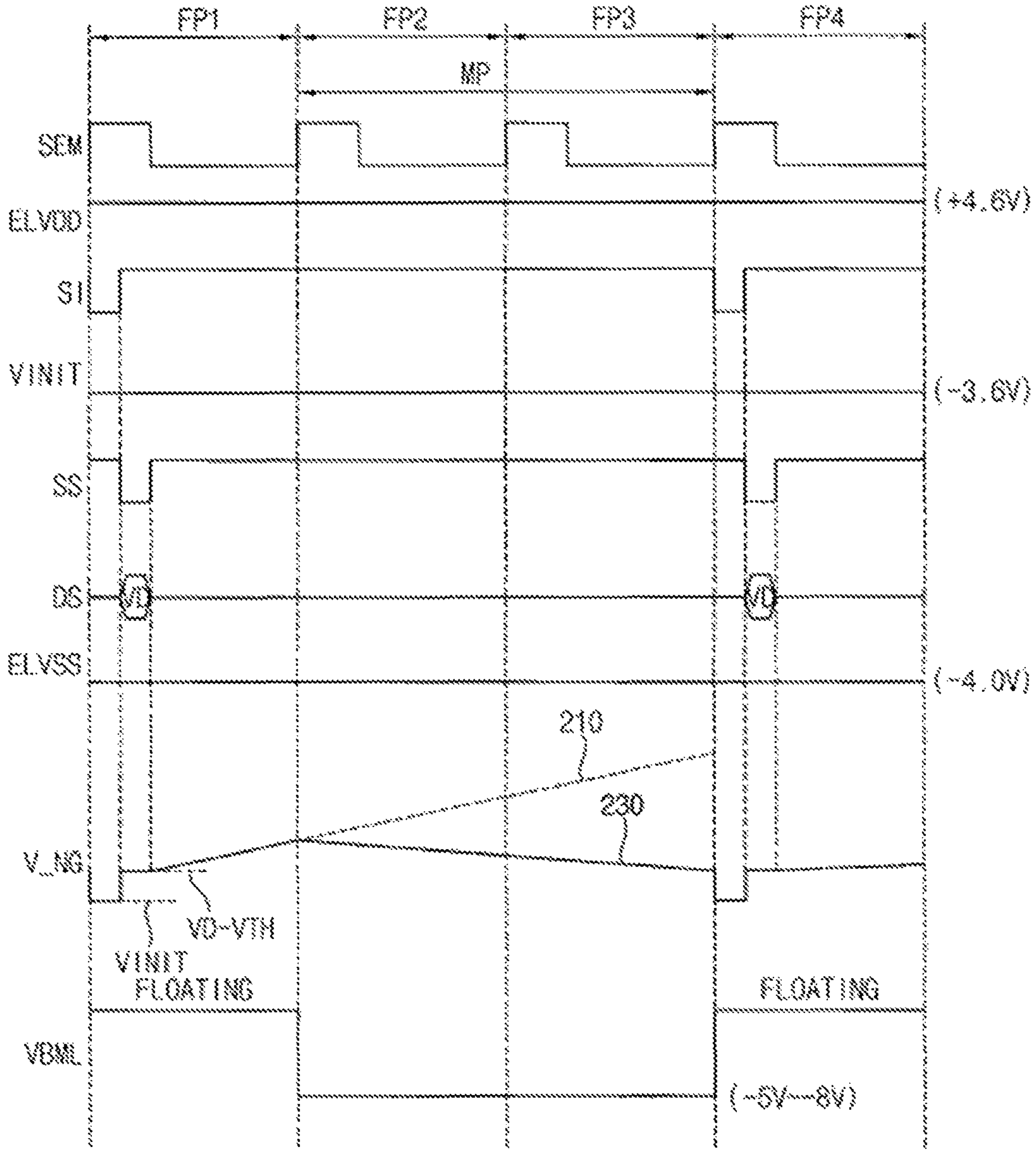
FIG. 5 is a timing diagram illustrating another example of an operation of a pixel of an organic light emitting diode display device according to one or more example embodiments.

FIG. 5 is a timing diagram illustrating another example of an operation of a pixel of an organic light emitting diode display device according to one or more example embodiments.

Referring to FIGS. 1 and 5, an organic light emitting diode display device including the pixel 100 may provide a bottom electrode voltage VBML having a negative voltage level during a masking period MP in which a display panel is not driven. An operation of the pixel 100 illustrated in FIG. 5 may be the same or substantially the same as (or similar to) the operation of the pixel 100 illustrated in FIG. 4, except that the bottom electrode 120 of the fourth sub-transistor T4-2 may receive the bottom electrode voltage VBML having the negative voltage level during the operating of the pixel 100 in FIG. 5. Accordingly, redundant description thereof may be simplified or may not be repeated.

In some example embodiments, as illustrated in FIG. 5, the bottom electrode voltage VBML may have the negative voltage level during the masking period MP. For example, the bottom electrode voltage VBML may be in a range from about −5V to about −8V, but the present inventive concept is not limited thereto. The bottom electrode voltage VBML may serve as a body voltage of the fourth sub-transistor T4-2, and thus, the fourth sub-transistor T4-2 may be turned on according to (e.g., based on) the bottom electrode voltage VBML having the negative voltage level. Accordingly, during the masking period MP (e.g., during the second and third frame periods FP2 and FP3), an on-current ION of the fourth sub-transistor T4-2 may flow from the node NT4 of the fourth transistor T4 to the line of the initialization voltage VINIT, and a voltage of the node NT4 of the fourth transistor T4 may be decreased. Thus, the voltage V_NG of the gate node NG may also be decreased as illustrated as a solid line 230 of FIG. 5. Therefore, during the masking period MP, a distortion of the voltage V_NG of the gate node NG may be compensated, a luminance degradation of the pixel 100 may be compensated, and thus, an image quality of the organic light emitting diode display device may be improved.

Figure 6:
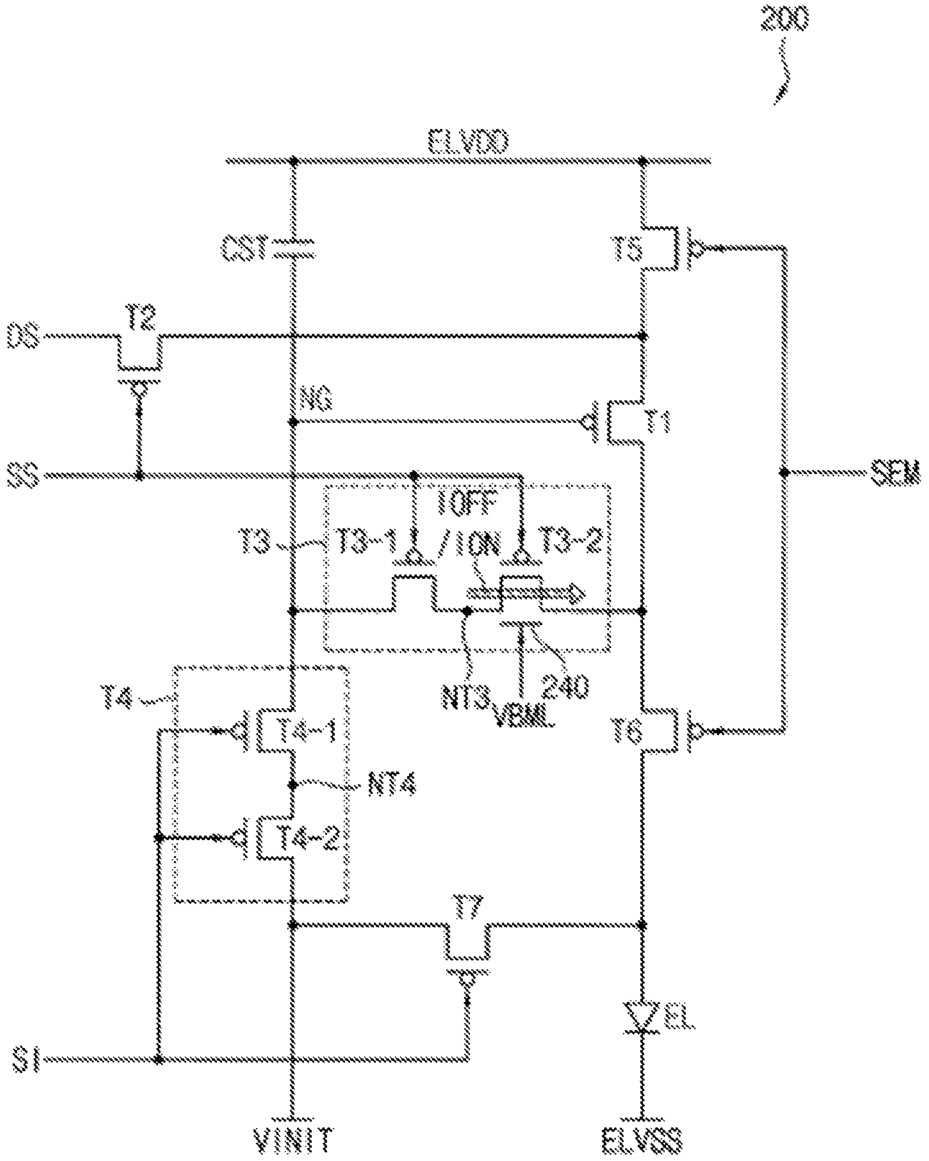
FIG. 6 is a circuit diagram illustrating a pixel of an organic light emitting diode display device according to one or more example embodiments.
Figure 7:
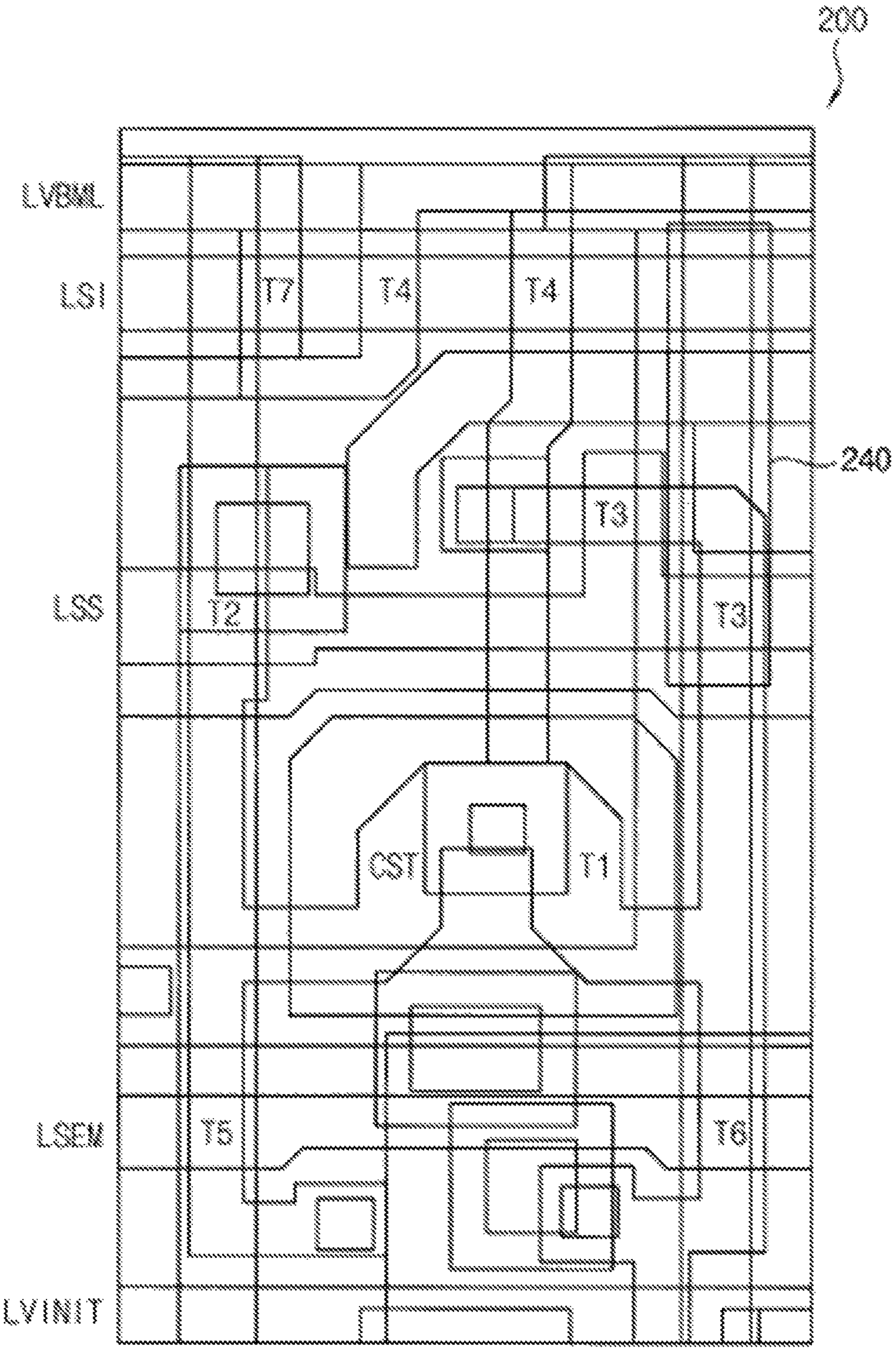
FIG. 7 is a diagram illustrating an example of a layout of the pixel of FIG. 6.

FIG. 6 is a circuit diagram illustrating a pixel of an organic light emitting diode display device according to one or more example embodiments, and FIG. 7 is a diagram illustrating an example of a layout of the pixel of FIG. 6.

Referring to FIG. 6, a pixel 200 of an organic light emitting diode display device according to one or more example embodiments may include a storage capacitor CST, a first transistor T1, a second transistor T2, a third transistor T3, a fourth transistor T4, and an organic light emitting diode EL. The third transistor T3 may include first and second sub-transistors T3-1 and T3-2 that are serially connected between a gate node NG and a drain of the first transistor T1. The fourth transistor T4 may include third and fourth sub-transistors T4-1 and T4-2 that are serially connected between the gate node NG and a line of an initialization voltage VINIT. In some example embodiments, the pixel 200 may further include a fifth transistor T5, a sixth transistor T6 and a seventh transistor T7. The pixel 200 of FIG. 6 may have the same or substantially the same (or a similar) configuration and/or operation as that of the pixel 100 of FIG. 1, except that the second sub-transistor T3-2 may include a bottom electrode 240 instead of the fourth sub-transistor T4-2.

In the pixel 200 of the organic light emitting diode display device according to one or more example embodiments, to compensate a voltage distortion of the gate node NG by leakage currents of the first sub-transistor T3-1 and the third sub-transistor T4-1, the second sub-transistor T3-2 may include the bottom electrode 240.

In some example embodiments, similar to the fourth transistor T4 illustrated in FIG. 2, the third transistor T3 may include a first gate electrode of the first sub-transistor T3-1, a first source of the first sub-transistor T3-1, a second gate electrode of the second sub-transistor T3-2, a second drain of the second sub-transistor T3-2, a node NT3 of the third transistor T3, and the bottom electrode 240. The first gate electrode of the first sub-transistor T3-1 may receive a scan signal SS, and the first source of the first sub-transistor T3-1 may be connected to the gate node NG. The second gate electrode of the second sub-transistor T3-2 may receive the scan signal SS, and the second drain of the second sub-transistor T3-2 may be connected to the drain of the first transistor T1. The node NT3 of the third transistor T3 may serve as a first drain of the first sub-transistor T3-1 and a second source of the second sub-transistor T3-2. The bottom electrode 240 may be disposed underneath the second gate electrode of the second sub-transistor T3-2.

Further, for example, as illustrated in FIG. 7, the pixel 200 may include the storage capacitor CST and the first through seventh transistors T1 through T7. The second sub-transistor T3-2 of the third transistor T3 may include the bottom electrode 240. Further, the pixel 200 may be connected to an initialization signal line LSI, a scan signal line LSS, an emission signal line LSEM, an initialization voltage line LVINIT, and a bottom electrode voltage line LVBML. In some example embodiments, the bottom electrode 240 of the second sub-transistor T3-2 may be connected to the bottom electrode voltage line LVBML, and may receive a bottom electrode voltage VBML.

In the pixel 200 of the organic light emitting diode display device according to example embodiments, when low frequency driving is performed, for example, during a masking period in which a display panel is not driven, the bottom electrode 220 of the second sub-transistor T3-2 may receive the bottom electrode voltage VBML through the bottom electrode voltage line LVBML. The bottom electrode 220 may provide an off-current IOFF or an on-current ION from the node NT3 of the third transistor T3 to the drain of the first transistor T1 according to (e.g., based on) the bottom electrode voltage VBML.

In some example embodiments, the bottom electrode voltage VBML may have a positive voltage level during the masking period. For example, the bottom electrode voltage VBML may be in a range from about 5V to about 8V, but the present inventive concept is not limited thereto. The bottom electrode voltage VBML may serve as a body voltage of the second sub-transistor T3-2, and thus, an off-current IOFF of the second sub-transistor T3-2 may be increased according to (e.g., based on) the bottom electrode voltage VBML having the positive voltage level. Accordingly, during the masking period, the off-current IOFF of the second sub-transistor T3-2 may flow from the node NT3 of the third transistor T3 to the drain of the first transistor T1, a voltage of the node NT3 of the third transistor T3 may be decreased, and thus, a voltage of the gate node NG also may be decreased. Therefore, during the masking period, a distortion of the voltage of the gate node NG may be compensated, a luminance degradation of the pixel 200 may be compensated, and thus, an image quality of the organic light emitting diode display device may be improved.

In other example embodiments, the bottom electrode voltage VBML may have a negative voltage level during the masking period. For example, the bottom electrode voltage VBML may be in a range from about −5V to about −8V, but the present inventive concept is not limited thereto. The bottom electrode voltage VBML may serve as a body voltage of the second sub-transistor T3-2, and thus, the second sub-transistor T3-2 may be turned on according to (e.g., based on) the bottom electrode voltage VBML having the negative voltage level. Accordingly, during the masking period, an on-current ION of the second sub-transistor T3-2 may flow from the node NT3 of the third transistor T3 to the drain of the first transistor T1, the voltage of the node NT3 of the third transistor T3 may be decreased, and thus, the voltage V_NG of the gate node NG may also be decreased. Therefore, during the masking period, the distortion of the voltage V_NG of the gate node NG may be compensated, the luminance degradation of the pixel 200 may be compensated, and thus, the image quality of the organic light emitting diode display device may be improved.

Figure 8:
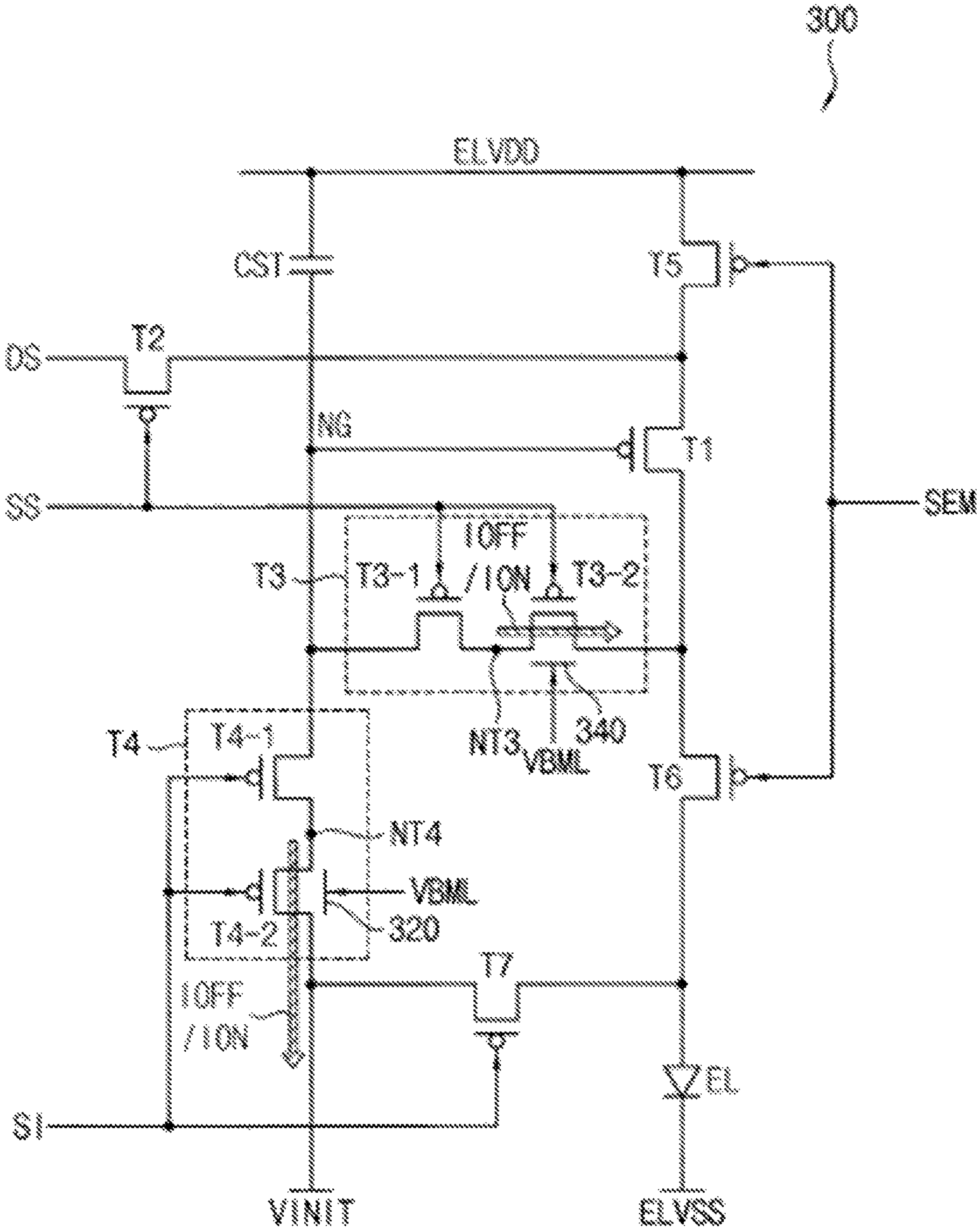
FIG. 8 is a circuit diagram illustrating a pixel of an organic light emitting diode display device according to one or more example embodiments.

FIG. 8 is a circuit diagram illustrating a pixel of an organic light emitting diode display device according to one or more example embodiments.

Referring to FIG. 8, a pixel 300 of an organic light emitting diode display device according to one or more example embodiments may include a storage capacitor CST, a first transistor T1, a second transistor T2, a third transistor T3, a fourth transistor T4, and an organic light emitting diode EL. The third transistor T3 may include first and second sub-transistors T3-1 and T3-2 that are serially connected between a gate node NG and a drain of the first transistor T1. The fourth transistor T4 may include third and fourth sub-transistors T4-1 and T4-2 that are serially connected between the gate node NG and a line of an initialization voltage VINIT. In some example embodiments, the pixel 300 may further include a fifth transistor T5, a sixth transistor T6, and a seventh transistor T7. The pixel 300 of FIG. 8 may have the same or substantially the same (or a similar) configuration and/or operation as that of the pixel 100 of FIG. 1 and/or the pixel 200 of FIG. 6, except that both of the second sub-transistor T3-2 and the fourth sub-transistor T4-2 may include bottom electrodes 320 and 340, respectively. Accordingly, redundant description thereof may be simplified or may not be repeated.

In the pixel 300 of the organic light emitting diode display device according to one or more example embodiments, to compensate a voltage distortion of the gate node NG by leakage currents of the first sub-transistor T3-1 and the third sub-transistor T4-1, the second sub-transistor T3-2 may include the bottom electrode 340, and the fourth sub-transistor T4-2 may include the bottom electrode 320.

When low frequency driving is performed, for example, during a masking period in which a display panel is not driven, the bottom electrode 340 of the second sub-transistor T3-2 and the bottom electrode 320 of the fourth sub-transistor T4-2 may receive a bottom electrode voltage VBML, and may compensate a voltage distortion of the gate node NG according to (e.g., based on) the bottom electrode voltage VBML. In some example embodiments, the bottom electrode voltage VBML may have a positive voltage level during the masking period. In this case, off-currents IOFF of the second sub-transistor T3-2 and the fourth sub-transistor T4-2 may be increased, and thus, the voltage distortion of the gate node NG may be compensated during the masking period. In other example embodiments, the bottom electrode voltage VBML may have a negative voltage level during the masking period. In this case, on-currents ION of the second sub-transistor T3-2 and the fourth sub-transistor T4-2 may be generated, and thus, the voltage distortion of the gate node NG may be compensated during the masking period.

Figure 9:
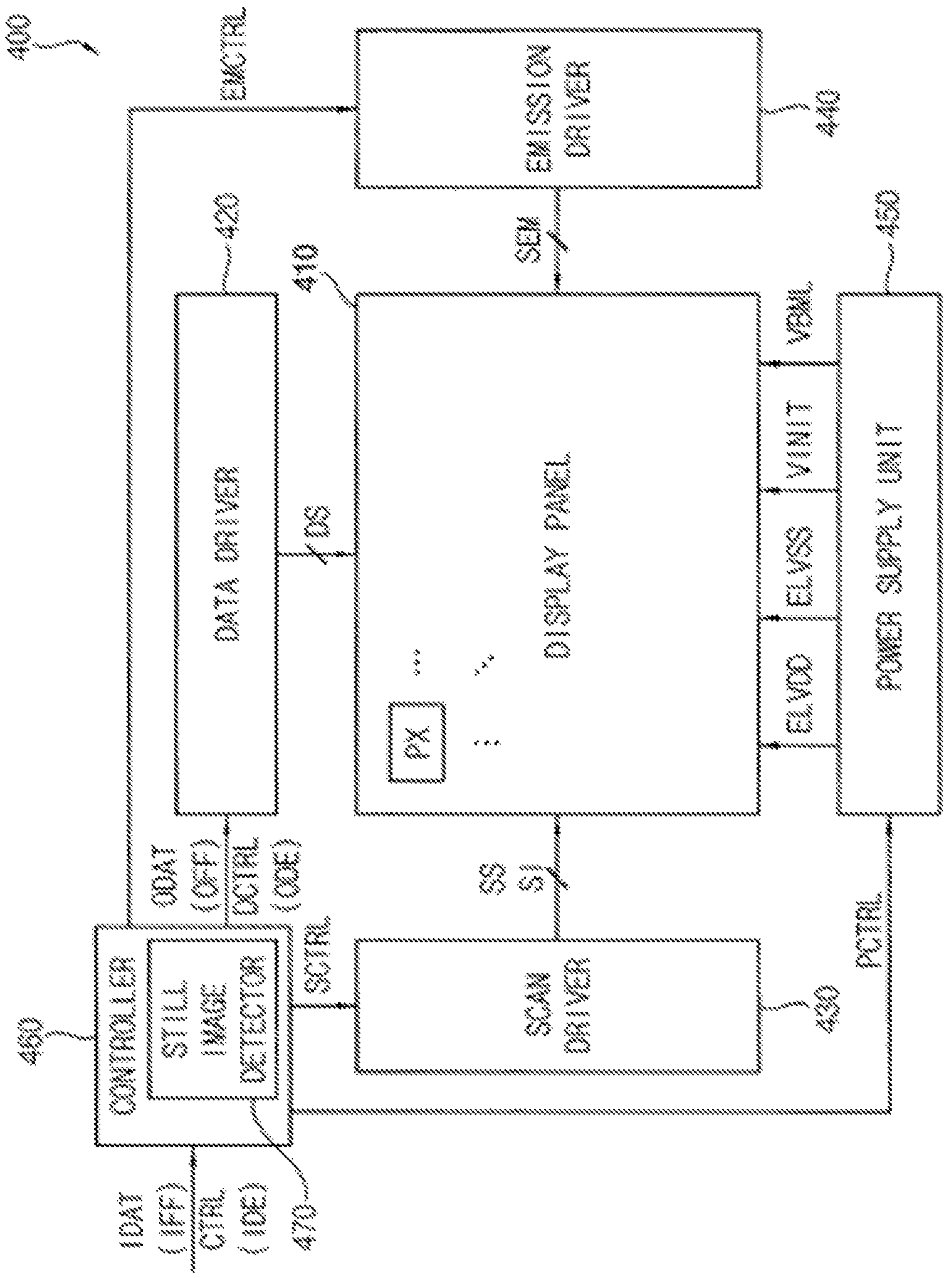
FIG. 9 is a block diagram illustrating an organic light emitting diode display device according to one or more example embodiments.
Figure 10:
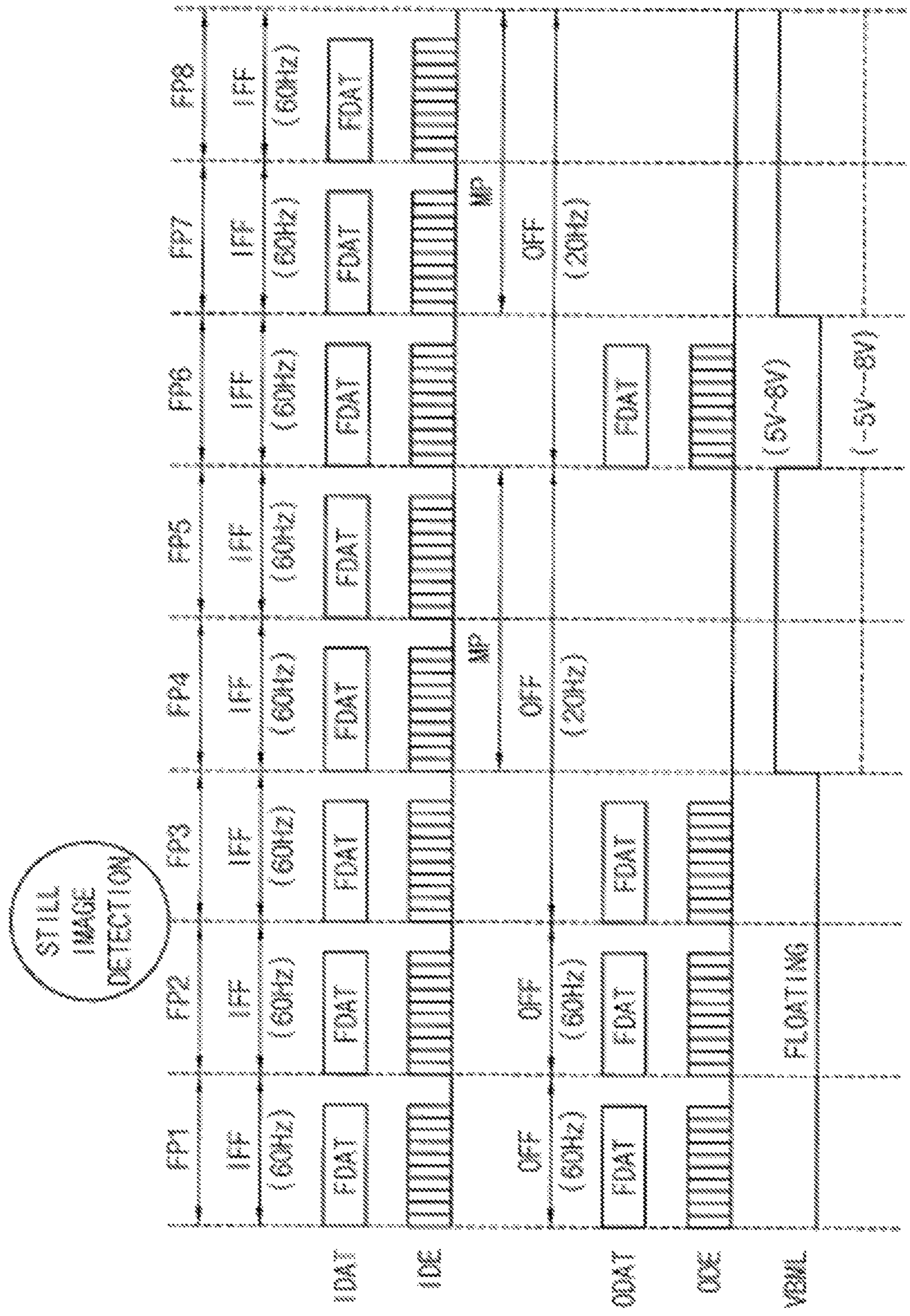
FIG. 10 is a timing diagram illustrating an example of an operation of an organic light emitting diode display device according to one or more example embodiments.

FIG. 9 is a block diagram illustrating an organic light emitting diode display device according to one or more example embodiments, and FIG. 10 is a timing diagram illustrating an example of an operation of an organic light emitting diode display device according to one or more example embodiments.

Referring to FIG. 9, an organic light emitting diode display device 400 according to one or more example embodiments may include a display panel 410 including a plurality of pixels PX, a data driver 420, a scan driver 430, an emission driver 440, a power supply unit (e.g., a power supply) 450, and a controller 460. The data driver 420 provides data signals DS to the plurality of pixels PX, the scan driver 430 provides scan signals SS and initialization signals SI to the plurality of pixels PX, and the emission driver 440 provides emission signals SEM to the plurality of pixels PX. The power supply unit 450 provides a first power supply voltage ELVDD, a second power supply voltage ELVSS, an initialization voltage VINIT, and a bottom electrode voltage VBML to the plurality of pixels PX. The controller 460 controls an operation of the organic light emitting diode display device 400, and provides control signals to control operations of the data driver 420, the scan driver 430, the emission driver 440, and the power supply unit 450.

The display panel 410 may include a plurality of data signal lines, a plurality of scan signal lines, a plurality of initialization signal lines, a plurality of emission signal lines, and the plurality of pixels PX connected to the signal lines. According to one or more example embodiments, each pixel PX may be the same or substantially the same as the pixel 100 of FIG. 1, the pixel 200 of FIG. 6, the pixel 300 of FIG. 8, and/or the like. In each pixel PX, a third transistor may include first and second sub-transistors that are serially connected between a gate node and a drain of a first transistor, and a fourth transistor may include third and fourth sub-transistors that are serially connected between the gate node and a line of the initialization voltage VINIT. Further, at least one of the second sub-transistor and the fourth sub-transistor may include a bottom electrode that receives the bottom electrode voltage VBML during a masking period.

The data driver 420 may generate the data signals DS according to (e.g., based on) a data control signal DCTRL and output image data ODAT received from the controller 460, and may provide the data signals DS to the plurality of pixels PX through the plurality of data signal lines. In some example embodiments, the data control signal DCTRL may include an output data enable signal ODE, a horizontal start signal, and a load signal, but the present inventive concept is not limited thereto. The data driver 420 may receive the output image data ODAT at an output frame frequency OFF from the controller 460. In some example embodiments, the data driver 420 may receive the output image data ODAT at the output frame frequency OFF that is the same or substantially the same as an input frame frequency IFF when a moving image is displayed, and may receive the output image data ODAT at the output frame frequency OFF that is lower than the input frame frequency IFF when a still image is displayed. Further, the data driver 420 may receive the output data enable signal ODE in synchronization with the output image data ODAT. In some example embodiments, the data driver 420 and the controller 460 may be implemented with a signal integrated circuit, and the signal integrated circuit may be referred to as a timing controller embedded data driver (TED). In other example embodiments, the data driver 420 and the controller 460 may be implemented with separate integrated circuits.

The scan driver 430 may generate the scan signals SS and the initialization signals SI according to (e.g., based on) a scan control signal SCTRL received from the controller 460, and may provide the scan signals SS and the initialization signals SI to the plurality of pixels PX through the plurality of scan signal lines and the plurality of initialization signal lines. In some example embodiments, the scan control signal SCTRL may include a scan start signal and a scan clock signal, but the present inventive concept is not limited thereto. In some example embodiments, the scan driver 430 may be integrated with or may be formed at (e.g., in or on) a peripheral portion of the display panel 410. In other example embodiments, the scan driver 430 may be implemented with one or more integrated circuits.

The emission driver 440 may generate the emission signals SEM according to (e.g., based on) an emission control signal EMCTRL received from the controller 460, and may provide the emission signals SEM to the plurality of pixels PX through the plurality of emission signal lines. In some example embodiments, the emission signals SEM may be sequentially provided to the plurality of pixels PX on a pixel row basis. In other example embodiments, the emission signals SEM may be a global signal that is concurrently (e.g., simultaneously or substantially simultaneously) provided to the plurality of pixels PX. In some example embodiments, the emission driver 440 may be integrated with or formed at (e.g., in or on) the peripheral portion of the display panel 410. In other example embodiments, the emission driver 440 may be implemented with one or more integrated circuits.

The power supply unit 450 may generate the first power supply voltage ELVDD, the second power supply voltage ELVSS, and the initialization voltage VINIT, and may provide the first power supply voltage ELVDD, the second power supply voltage ELVSS, and the initialization voltage VINIT to the plurality of pixels PX. Further, the power supply unit 450 may generate a bottom electrode voltage VBML during a masking period in which the display panel 410 is not driven according to (e.g., based on) a power control signal PCTRL, and may provide the bottom electrode voltage VBML to the plurality of pixels PX during the masking period. In some example embodiments, the bottom electrode voltage VBML may be a positive voltage, for example, in a range from about 5V to about 8V, but the present inventive concept is not limited thereto. In other example embodiments, the bottom electrode voltage VBML may be a negative voltage, for example, in a range from about −5V to about −8V, but the present inventive concept is not limited thereto. In some example embodiments, the power supply unit 450 may be implemented in the form of an integrated circuit, and the integrated circuit may be referred to as a power management integrated circuit (PMIC). In other example embodiments, the power supply unit 450 may be included in the controller 460 or in the data driver 420.

The controller (e.g., a timing controller (TCON)) 460 may receive input image data IDAT and a control signal CTRL from an external host (e.g., an application processor (AP), a graphic processing unit (GPU), a graphic card, and/or the like). In some example embodiments, the control signal CTRL may include a vertical synchronization signal, a horizontal synchronization signal, an input data enable signal IDE, a master clock signal, and/or the like, but the present inventive concept is not limited thereto. The controller 460 may generate the output image data ODAT, the data control signal DCTRL, the scan control signal SCTRL, the emission control signal EMCTRL, and the power control signal PCTRL according to (e.g., based on) the input image data IDAT and the control signal CTRL. The controller 460 may control an operation of the data driver 420 by providing the output image data ODAT and the data control signal DCTRL to the data driver 420, an operation of the scan driver 430 by providing the scan control signal SCTRL to the scan driver 430, an operation of the emission driver 440 by providing the emission control signal EMCTRL to the emission driver 440, and an operation of the power supply unit 450 by providing the power control signal PCTRL to the power supply unit 450.

The organic light emitting diode display device 400 according to one or more example embodiments may detect whether the input image data IDAT represents a still image, and may set at least one frame period as the masking period when the input image data IDAT represents the still image. In this case, the organic light emitting diode display device 400 may perform low frequency driving to drive the display panel 410 at a driving frequency that is lower than the input frame frequency IFF by not driving the display panel 410 during the masking period. In some example embodiments, to perform the low frequency driving, the controller 460 of the organic light emitting diode display device 400 may include a still image detector 470.

The still image detector 470 may receive the input image data IDAT at the input frame frequency IFF, and may determine whether the input image data IDAT represents the still image. In some example embodiments, the still image detector 470 may determine whether the input image data IDAT represents the still image by comparing the input image data IDAT for a previous frame period with the input image data IDAT for a current frame period. For example, the still image detector 470 may store a representative value (e.g., an average value, a checksum, and/or the like) of the input image data IDAT for the previous frame period, may calculate a representative value of the input image data IDAT for the current frame period, and may compare the stored representative value (e.g., for the previous frame) with the calculated representative value (e.g., for the current frame) to determine whether the input image data IDAT represents the still image.

In a case where the input image data IDAT represents the still image, to drive the display panel 410 at the driving frequency or at the output frame frequency OFF that is lower than the input frame frequency IFF, the controller 460 may set at least one frame period as the masking period, and may not drive the display panel 410 during the masking period. For example, the controller 460 may control the data driver 420 to not provide the data signals DS to the plurality of pixels PX during the masking period, and may control the scan driver 430 to not provide the scan signals SS to the plurality of pixels PX during the masking period. In some example embodiments, during the masking period, the emission driver 400 may provide the emission signals SEM to the plurality of pixels PX at the input frame frequency IFF, such that the display panel 410 may periodically emit light. Further, in some example embodiments, the power supply unit 450 may provide the bottom electrode voltage VBML to the bottom electrode of each pixel PX. Accordingly, a voltage distortion of the gate node of each pixel PX may be compensated.

For example, as illustrated in FIG. 10, the controller 460 may receive the input image data IDAT at the input frame frequency IFF of about 60 Hz, and may receive the input data enable signal IDE in synchronization with the input image data IDAT. For example, the controller 460 may receive, as the input image data IDAT, 60 (sixty) frame data FDAT for about one second. During first and second frame periods FP1 and FP2, where the input image data IDAT does not represent the still image, or the input image data IDAT represents the moving image, the controller 460 may provide the data driver 420 with the output image data ODAT at the output frame frequency OFF of about 60 Hz, which is the same or substantially the same as the input frame frequency IFF, and may further provide the data driver 420 with the output data enable signal ODE in synchronization with the output image data ODAT.

In a case where the still image detector 470 determines that the input image data IDAT represents the still image, the controller 460 may determine the driving frequency of the display panel 410, or the output frame frequency OFF, to be lower than the input frame frequency IFF. In some example embodiments, the controller 460 may determine a flicker value (e.g., a value representing a level of a flicker perceived by a user) corresponding to a gray level (e.g., a grayscale level) or luminance of the input image data IDAT, and may determine the driving frequency of the display panel 410 according to (e.g., based on) the flicker value. For example, as illustrated in FIG. 10, in a case where the input frame frequency IFF is about 60 Hz, and the driving frequency of the display panel 410, or the output frame frequency OFF, is determined as about 20 Hz, the controller 460 may set two frame periods from among three consecutive frame periods as the masking period MP. In the example of FIG. 10, the controller 460 may set fourth and fifth frame periods FP4 and FP5 from among third through fifth frame periods FP3, FP4, and FP5 as the masking period MP, and may set seventh and eighth frame periods FP7 and FP8 from among sixth through eighth frame periods FP6, FP7, and FP8 as the masking period MP.

During the masking period MP, the controller 460 may control the data driver 420 to not provide the data signals DS to the plurality of pixels PX. For example, during the third frame period FP3, the controller 460 may provide the data driver 420 with the frame data FDAT as the output image data ODAT, and the output data enable signal ODE synchronized with the output image data ODAT. However, during the masking period MP, or during the fourth and fifth frame periods FP4 and FP5, the controller 460 may not provide the output image data ODAT and the output data enable signal ODE to the data driver 420. In other words, the controller 460 may provide the data driver 420 with one frame of data FDAT during the three frame periods FP3, FP4, and FP5, and thus, the data driver 420 may drive the display panel 410 at the driving frequency, or the output frame frequency OFF, of about 20 Hz, which is one third of the input frame frequency IFF of about 60 Hz.

Further, during the masking period MP, or during the fourth and fifth frame periods FP4 and FP5, the controller 460 may control the power supply unit 450 to provide the bottom electrode voltage VBML to the bottom electrode of each pixel PX. In some example embodiments, the bottom electrode voltage VBML may be a positive voltage, for example, in a range from about 5V to about 8V, but the present inventive concept is not limited thereto. In other example embodiments, the bottom electrode voltage VBML may be a negative voltage, for example, in a range from about −5V to about −8V, but the present inventive concept is not limited thereto. Accordingly, a voltage distortion of the gate node of each pixel PX during the masking period MP may be compensated, and thus, the image quality of the organic light emitting diode display device 400 may be improved.

As described above, the organic light emitting diode display device 400 according to one or more example embodiments may perform the low frequency driving by detecting the still image, and may set at least one frame period as the masking period MP when performing the low frequency driving. Further, the organic light emitting diode display device 400 may provide the bottom electrode voltage VBML to the bottom electrode of each pixel PX during the masking period MP. Accordingly, the voltage distortion of the gate node of each pixel PX during the masking period MP may be compensated, and thus, the image quality of the organic light emitting diode display device 400 may be improved.

Figure 11:
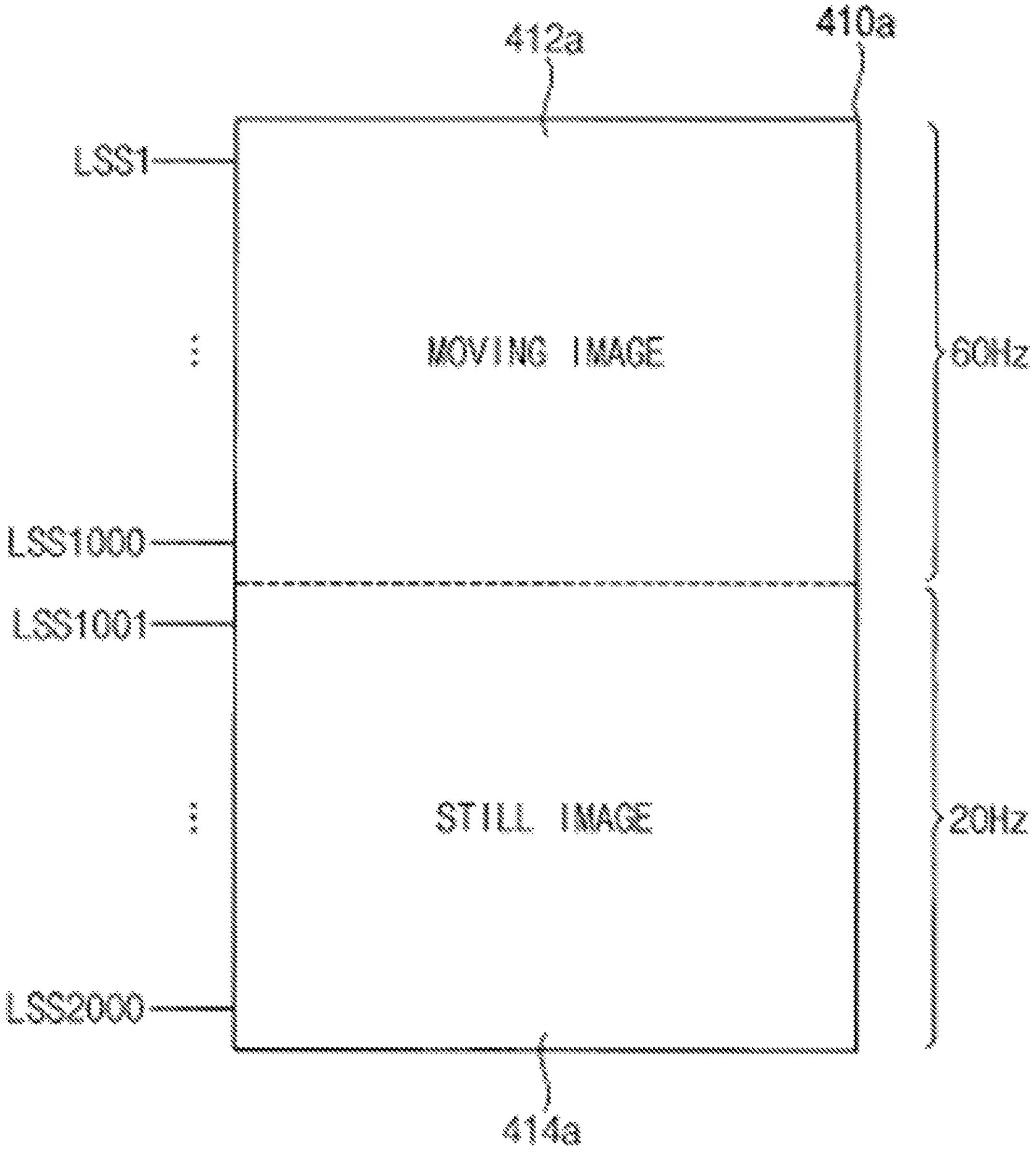
FIG. 11 is a diagram illustrating an example of an operation of an organic light emitting diode display device that performs multi-frequency driving according to one or more example embodiments.
Figure 12:
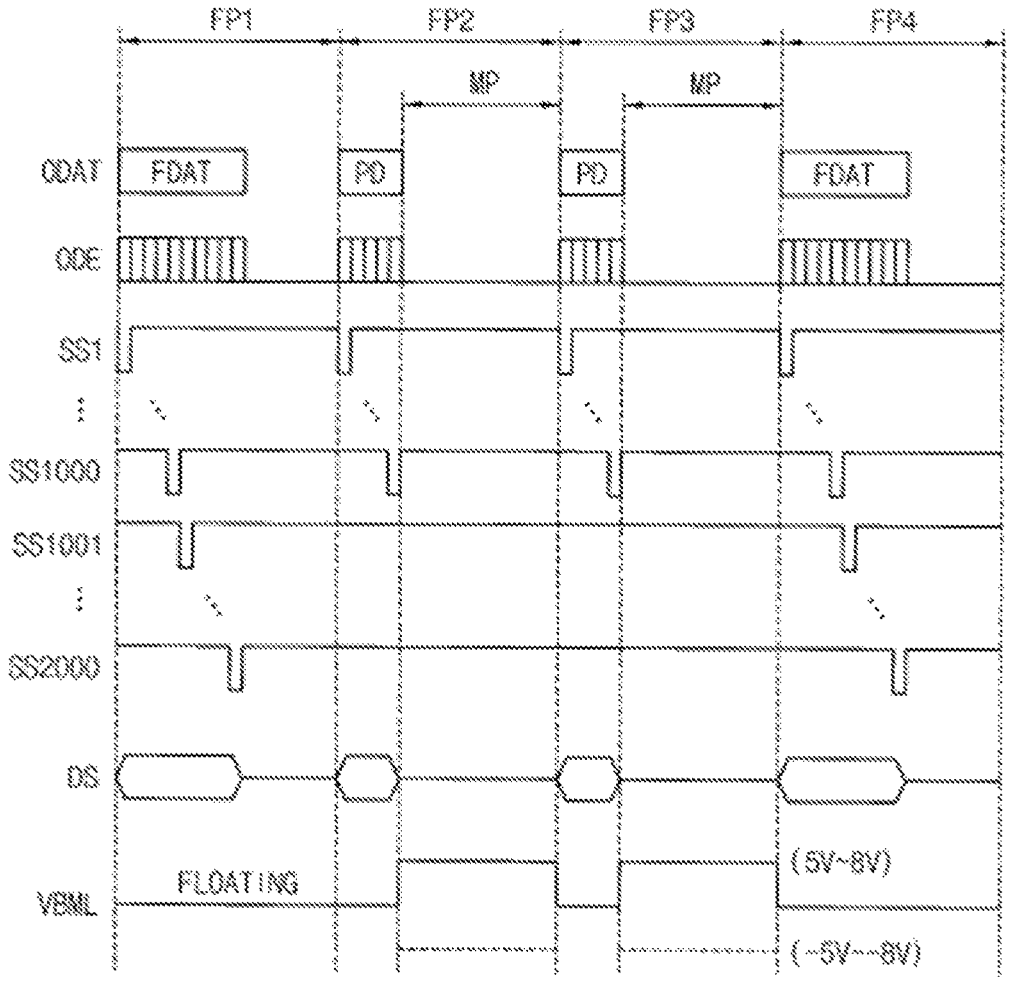
FIG. 12 is a timing diagram illustrating an example of an operation of an organic light emitting diode display device that performs multi-frequency driving according to one or more example embodiments.

FIG. 11 is a diagram illustrating an example of an operation of an organic light emitting diode display device that performs multi-frequency driving (MFD) according to one or more example embodiments, and FIG. 12 is a timing diagram illustrating an example of an operation of an organic light emitting diode display device that performs multi-frequency driving according to one or more example embodiments.

Referring to FIGS. 9 and 11, the organic light emitting diode display device 400 according to one or more example embodiments may perform multi-frequency driving (MFD) (e.g., or partial frequency driving). In a case where the multi-frequency driving is performed, the organic light emitting diode display device 400 may drive a first portion 412*a* of a display panel 410*a* (e.g., including first through 1000-th scan signal lines LSS1 through LSS1000) at a first driving frequency (e.g., about 60 Hz), and may drive a second portion 414*a* of the display panel 410*a* (e.g., including 1001-th through 2000-th scan signal lines LSS1001 through LSS2000) at a second driving frequency (e.g., about 20 Hz) different from the first driving frequency.

In some example embodiments, the still image detector 470 may receive the input image data IDAT at the input frame frequency IFF, may divide the input image data IDAT into a plurality of partial image data, and may determine whether each of the plurality of partial image data represents a still image. For example, each partial image data may correspond to N consecutive scan signal lines, where N is an integer greater than 0. In some example embodiments, the still image detector 470 may detect a boundary between a moving image and a still image, and may divide the input image data IDAT into first partial image data for the moving image and second partial image data for the still image. For example, as illustrated in FIG. 11, in a case where the moving image is displayed at (e.g., in or on) the first portion 412*a* of the display panel 410*a* including the first through 1000-th scan signal lines LSS1 through LSS1000, and the still image is displayed at (e.g., in or on) the second portion 414*a* of the display panel 410*a* including the 1001-th through 2000-th scan signal lines LSS1001 through LSS2000, the still image detector 470 may divide the input image data IDAT into the first partial image data for the first portion 412*a* of the display panel 410*a* and the second partial image data for the second portion 414*a* of the display panel 410*a*. Further, the still image detector 470 may determine that the first partial image data for the first portion 412*a* of the display panel 410*a* does not represent the still image, and may determine that the second partial image data for the second portion 414*a* of the display panel 410*a* represents the still image.

In a case where at least one partial image data of the plurality of partial image data represents the still image, to drive a portion of the display panel 410*a* corresponding to the at least one partial image data at a driving frequency lower than the input frame frequency IFF, the controller 460 may set a portion of a frame period corresponding to the portion of the display panel 410*a* as a masking period.

For example, as illustrated in FIGS. 11 and 12, in a case where the still image detector 470 determines that the first partial image data for the first portion 412*a* of the display panel 410*a* does not represent the still image, and determines that the second partial image data for the second portion 414*a* of the display panel 410*a* represents the still image, the controller 460 may determine the first driving frequency for the first portion 412*a* of the display panel 410*a* as the input frame frequency IFF of about 60 Hz, and may determine the second driving frequency for the second portion 414*a* of the display panel 410*a* to be lower than the input frame frequency IFF, for example, as about 20 Hz. In this case, during a first frame period FP1, the controller 460 may provide the data driver 420 with frame data FDAT for the entire display panel 410*a* and an output data enable signal ODE, the data driver 420 may provide data signals DS to the entire display panel 410*a*, and the scan driver 430 may provide first through 2000-th scan signals SS1, . . . , SS1000, SS1001, . . . , SS2000 to the entire display panel 410*a*. The controller 460 may set a portion of a second frame period FP2 and a portion of a third frame period FP3 corresponding to the second portion 414*a* of the display panel 410*a* (or the portion of each of the second and third frame periods FP2 and FP3 that is assigned to provide the data signals DS and the 1001-th through 2000-th scan signals SS1001, . . . , SS2000) as the masking period MP. Accordingly, during each of the second and third frame periods FP2 and FP3, the controller 460 may provide the data driver 420 with the first partial image data PD for the first portion 412*a* (e.g., without the partial image data for the second portion 414*a*) of the display panel 410*a* and the output data enable signal ODE synchronized with the first partial image data PD, the data driver 420 may provide data signals DS to the first portion 412*a* (e.g., without providing data signals DS to the second portion 414*a*) of the display panel 410*a*, and the scan driver 430 may provide the first through 1000-th scan signals SS1, . . . , SS1000 to the first portion 412*a* (e.g., without providing the 1001-th through 2000-th scan signals SS1001, . . . , SS2000 to the second portion 414*a*) of the display panel 410*a*. Accordingly, the first portion 412*a* of the display panel 410*a* may be driven at the first driving frequency of about 60 Hz, and the second portion 414*a* of the display panel 410*a* may be driven at the second driving frequency of about 20 Hz. Further, during each masking period MP, the power supply unit 450 may provide the bottom electrode voltage VBML to the bottom electrode of each pixel PX. Accordingly, a voltage distortion of the gate node of each pixel PX during the masking period MP may be compensated, and thus, the image quality of the organic light emitting diode display device 400 may be improved.

Figure 13:
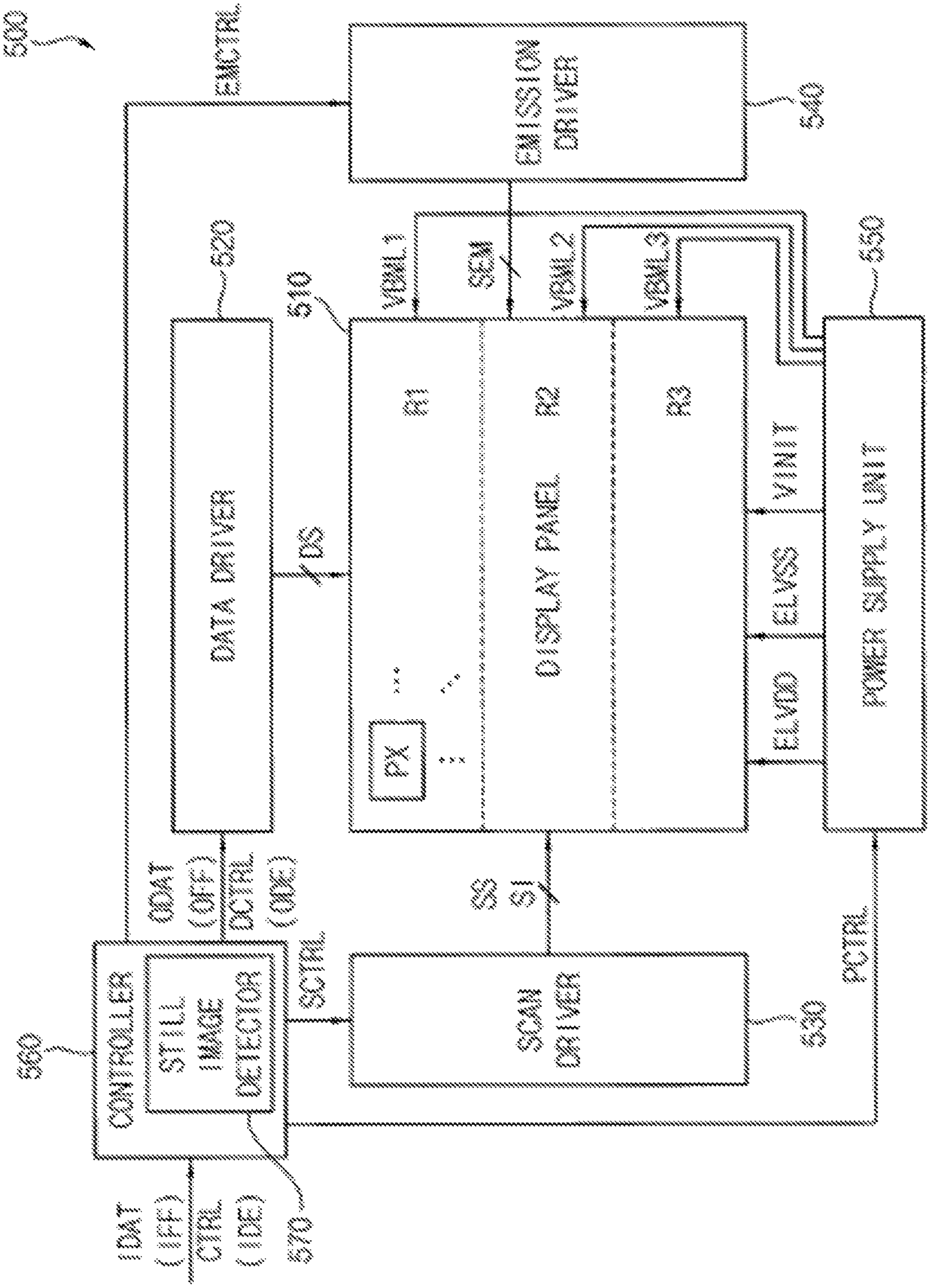
FIG. 13 is a block diagram illustrating an organic light emitting diode display device according to one or more example embodiments.
Figure 14:
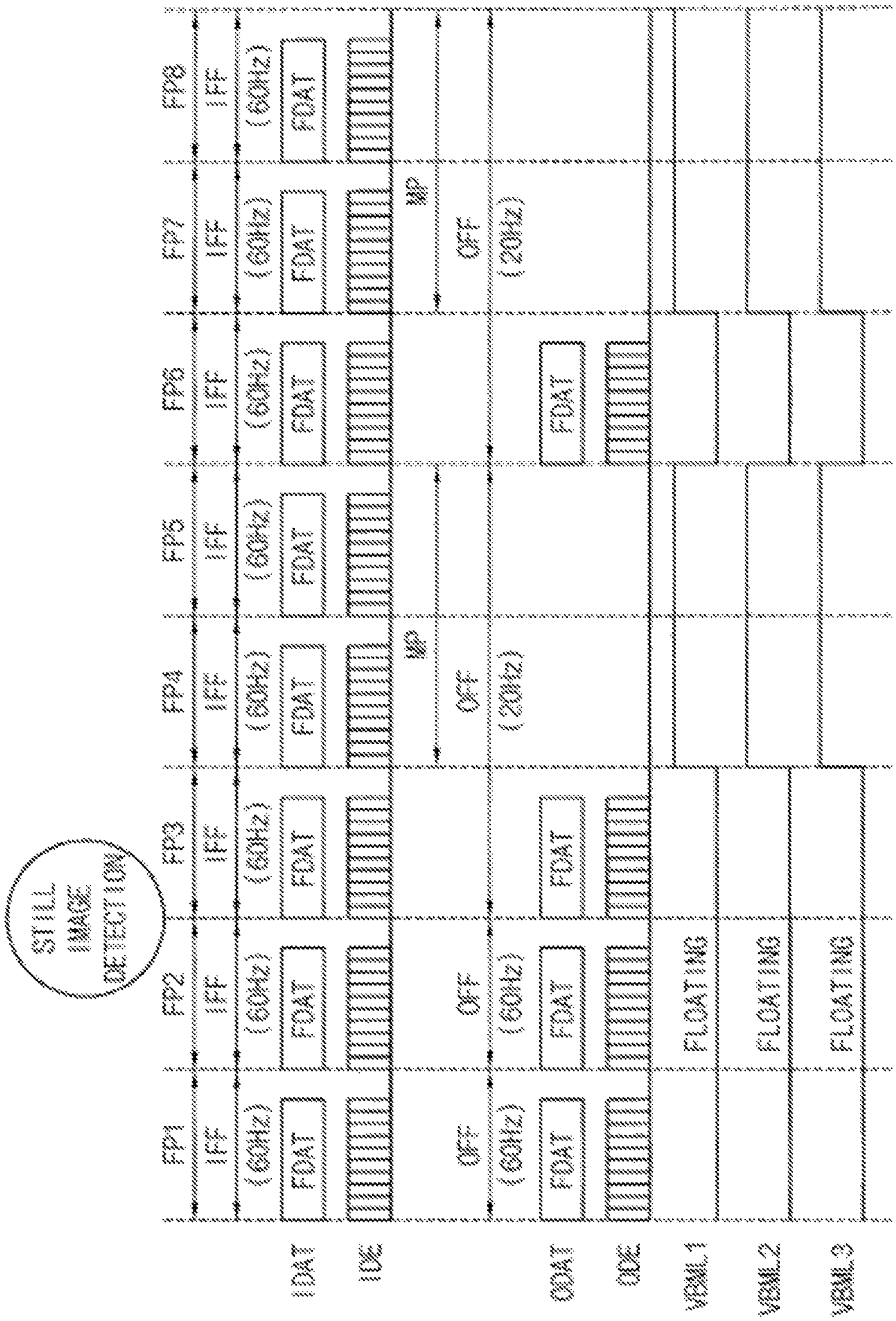
FIG. 14 is a timing diagram illustrating an example of an operation of the organic light emitting diode display device of FIG. 13.

FIG. 13 is a block diagram illustrating an organic light emitting diode display device according to one or more example embodiments, and FIG. 14 is a timing diagram illustrating an example of an operation of the organic light emitting diode display device of FIG. 13.

Referring to FIG. 13, an organic light emitting diode display device 500 according to one or more example embodiments may include a display panel 510 including a plurality of pixels PX, a data driver 520, a scan driver 530, an emission driver 540, a power supply unit (e.g., a power supply) 550, and a controller 560. The data driver 520 may provide data signals DS to the plurality of pixels PX, the scan driver 530 may provide scan signals SS and initialization signals SI to the plurality of pixels PX, and the emission driver 540 may provide emission signals SEM to the plurality of pixels PX. The power supply unit 550 may provide a first power supply voltage ELVDD, a second power supply voltage ELVSS, an initialization voltage VINIT, and a bottom electrode voltage VBML to the plurality of pixels PX. The controller 560 may control an operation of the organic light emitting diode display device 500, and may provide control signals to control operations of the data driver 520, the scan driver 530, the emission driver 540, and the power supply unit 550. The controller 560 may include a still image detector 570 that determines whether input image data DAT represents a still image. The organic light emitting diode display device 500 of FIG. 13 may have the same or substantially the same (or a similar) configuration and/or operation as that of the organic light emitting diode display device 400 of FIG. 9, except that the display panel 510 may include a plurality of regions R1, R2 and R3, and the power supply unit 550 may provide different bottom electrode voltages VBML1, VBML2 and VBML3 to the plurality of regions R1, R2 and R3 during a masking period. Accordingly, redundant description thereof may be simplified or may not be repeated.

As illustrated in FIGS. 13 and 14, the controller 560 may set at least one frame period (e.g., fourth and fifth frame periods FP4 and FP5) as the masking period MP in which the display panel 510 is not driven. During the masking period MP, the power supply unit 550 may provide a first bottom electrode voltage VBML1 to a first region R1 of the display panel 510, a second bottom electrode voltage VBML2 to a second region R2 of the display panel 510, and a third bottom electrode voltage VBML3 to a third region R3 of the display panel 510. The first, second, and third bottom electrode voltages VBML1, VBML2, and VBML3 may be provided to the display panel 510 through different lines. In some example embodiments, the first, second, and third bottom electrode voltages VBML1, VBML2, and VBML3 may have different voltage levels from each other (or from at least one other). Accordingly, voltage distortions of gate nodes of the pixels PX at (e.g., in or on) the first, second, and third regions R1, R2, and R3 of the display panel 510 may be more accurately compensated.

Figure 15:
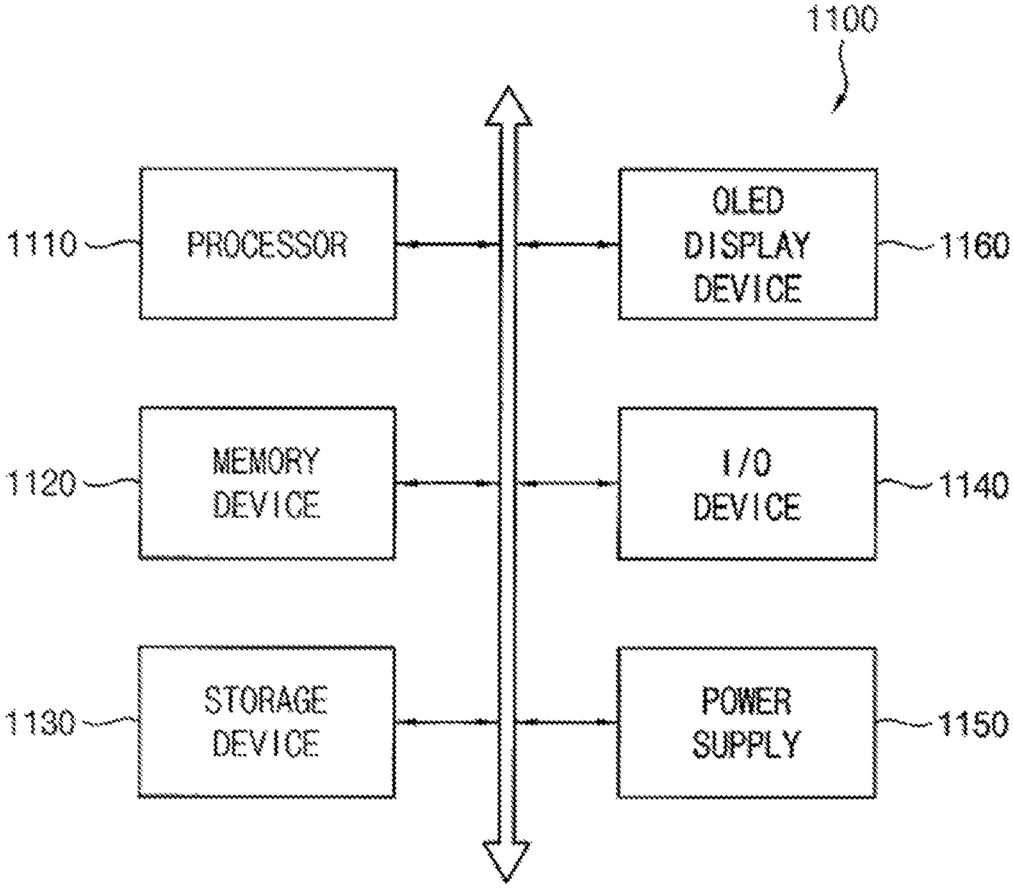
FIG. 15 is an electronic device including an organic light emitting diode display device according to one or more example embodiments.

FIG. 15 is an electronic device including an organic light emitting diode display device according to one or more example embodiments.

Referring to FIG. 15, an electronic device 1100 may include a processor 1110, a memory device 1120, a storage device 1130, an input/output (I/O) device 1140, a power supply 1150, and an organic light emitting diode display device 1160. The electronic device 1100 may further include a plurality of ports for communicating with a video card, a sound card, a memory card, a universal serial bus (USB) device, other electric devices, and/or the like.

The processor 1110 may perform various computing functions and/or tasks. The processor 1110 may be an application processor (AP), a microprocessor, a central processing unit (CPU), and/or the like. The processor 1110 may be coupled to other components via an address bus, a control bus, a data bus, and/or the like. Further, in some example embodiments, the processor 1110 may be further coupled to an extended bus, such as a peripheral component interconnection (PCI) bus and/or the like.

The memory device 1120 may store data for operations of the electronic device 1100. For example, the memory device 1120 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and/or the like, and/or at least one volatile memory device, such as a dynamic random access memory (DRAM) device, a static random access memory (SRAM) device, a mobile dynamic random access memory (mobile DRAM) device, and/or the like.

The storage device 1130 may be a solid state drive (SSD) device, a hard disk drive (HDD) device, a CD-ROM device, and/or the like. The I/O device 1140 may be an input device, such as a keyboard, a keypad, a mouse, a touch screen, and/or the like, and an output device, such as a printer, a speaker, and/or the like. The power supply 1150 may supply power for operations of the electronic device 1100. The organic light emitting diode display device 1160 may be coupled to other components through the buses or other communication links.

In each pixel of the organic light emitting diode display device 1160, a third transistor (e.g., a threshold voltage compensating transistor) may include first and second sub-transistors that are serially connected between a gate node and a drain of a first transistor, a fourth transistor (e.g., a gate initializing transistor) may include third and fourth sub-transistors that are serially connected between the gate node and a line of an initialization voltage, and at least one of the second sub-transistor and the fourth sub-transistor may include a bottom electrode. In some example embodiments, the bottom electrode may receive a bottom electrode voltage that is a positive voltage or a negative voltage during a masking period in which a display panel is not driven. Accordingly, a voltage distortion of the gate node at low frequency driving may be compensated, and an image quality of the organic light emitting diode display device 1160 may be improved.

One or more of the example embodiments of the inventive concept may be applied to any suitable organic light emitting diode display device 1160, and/or any suitable electronic device 1100 including the organic light emitting diode display device 1160. For example, one or more of the example embodiments of the inventive concept may be applied to a mobile phone, a smart phone, a wearable electronic device, a tablet computer, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, and/or the like.

The foregoing is illustrative of example embodiments, and is not to be construed as limiting thereof. Although some example embodiments have been described, those skilled in the art will readily appreciate that various modifications are possible in the example embodiments without departing from the spirit and scope of the present inventive concept. Accordingly, all such modifications are intended to be included within the spirit and scope of the present inventive concept, as defined in the claims and their equivalents. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the appended claims, and their equivalents.

What is claimed is:

1. A pixel of an organic light emitting diode display device, the pixel comprising:

a storage capacitor comprising a first electrode connected to a line of a first power supply voltage, and a second electrode connected to a gate node;

a first transistor comprising a gate electrode connected to the gate node;

a second transistor configured to transfer a data signal to a source of the first transistor in response to a scan signal;

a third transistor configured to diode-connect the first transistor in response to the scan signal, the third transistor comprising first and second sub-transistors serially connected between the gate node and a drain of the first transistor, the first and second sub-transistors comprising first and second active regions spaced from each other in a plan view, first and second gate electrodes overlapping with the first and second active regions, respectively, and a node of the third transistor between the first and second active regions of the first and second sub-transistors;

a fourth transistor configured to transfer an initialization voltage to the gate node in response to an initialization signal, the fourth transistor comprising third and fourth sub-transistors serially connected between the gate node and a line of the initialization voltage, the third and fourth sub-transistors comprising third and fourth active regions spaced from each other in a plan view, third and fourth gate electrodes overlapping with the third and fourth active regions, respectively, and a node of the fourth transistor between the third and fourth active regions of the third and fourth sub-transistors; and an organic light emitting diode comprising an anode, and a cathode connected to a line of a second power supply voltage, wherein at least one of the second sub-transistor or the fourth sub-transistor comprises a bottom electrode to decrease a voltage of at least one of the node of the third transistor or the node of the fourth transistor in response to a bottom electrode voltage, wherein, in a plan view, the bottom electrode overlaps with at least one of the second gate electrode or the fourth gate electrode, while being spaced from the first gate electrode and the third gate electrode, wherein at least one of the second gate electrode or the fourth gate electrode is disposed over a corresponding one of the second active region and the fourth active region, and the bottom electrode is disposed under the corresponding one of the second active region and the fourth active region, wherein, in a plan view, an end of the bottom electrode overlaps with a space defined between the first and second gate electrodes or between the third and fourth gate electrodes, and wherein the bottom electrode is configured to receive a bottom electrode voltage during a masking period in which a display panel of the organic light emitting diode display device is not driven such that the display panel displays an image based on previously stored data signals of a previous frame period.

2. The pixel of claim 1, wherein the fourth transistor comprises:

the third gate electrode of the third sub-transistor configured to receive the initialization signal;

a first source of the third sub-transistor connected to the gate node;

the fourth gate electrode of the fourth sub-transistor configured to receive the initialization signal;

a second drain of the fourth sub-transistor connected to the line of the initialization voltage;

the node of the fourth transistor configured as a first drain of the third sub-transistor and a second source of the fourth sub-transistor; and the bottom electrode located under the fourth gate electrode of the fourth sub-transistor.

3. The pixel of claim 2, wherein the bottom electrode of the fourth transistor is configured to receive the bottom electrode voltage during the masking period.

4. The pixel of claim 3, wherein the bottom electrode voltage has a positive voltage level during the masking period.

5. The pixel of claim 4, wherein an off-current of the fourth sub-transistor is increased according to the bottom electrode voltage having the positive voltage level, and wherein the off-current of the fourth sub-transistor flows from the node of the fourth transistor to the line of the initialization voltage during the masking period.

6. The pixel of claim 3, wherein the bottom electrode voltage has a negative voltage level during the masking period.

7. The pixel of claim 6, wherein the fourth sub-transistor is configured to be turned on according to the bottom electrode voltage having the negative voltage level, and wherein an on-current of the fourth sub-transistor flows from the node of the fourth transistor to the line of the initialization voltage.

8. The pixel of claim 1, wherein the third transistor comprises:

the first gate electrode of the first sub-transistor configured to receive the scan signal;

a first source of the first sub-transistor connected to the gate node;

the second gate electrode of the second sub-transistor configured to receive the scan signal;

a second drain of the second sub-transistor connected to the drain of the first transistor;

the node of the third transistor configured as a first drain of the first sub-transistor and a second source of the second sub-transistor; and the bottom electrode located under the second gate electrode of the second sub-transistor.

9. The pixel of claim 8, wherein the bottom electrode of the third transistor is configured to receive the bottom electrode voltage during the masking period.

10. The pixel of claim 9, wherein the bottom electrode voltage has a positive voltage level during the masking period.

11. The pixel of claim 10, wherein an off-current of the second sub-transistor is increased according to the bottom electrode voltage having the positive voltage level, and wherein the off-current of the second sub-transistor flows from the node of the third transistor to the drain of the first transistor during the masking period.

12. The pixel of claim 9, wherein the bottom electrode voltage has a negative voltage level during the masking period.

13. The pixel of claim 12, wherein the second sub-transistor is configured to be turned on according to the bottom electrode voltage having the negative voltage level, and wherein an on-current of the second sub-transistor flows from the node of the third transistor to the drain of the first transistor.

14. The pixel of claim 1, wherein each of the second sub-transistor and the fourth sub-transistor comprises the bottom electrode.

15. The pixel of claim 1, further comprising:

a fifth transistor comprising a gate electrode configured to receive an emission signal, a source connected to the line of the first power supply voltage, and a drain connected to the source of the first transistor;

a sixth transistor comprising a gate electrode configured to receive the emission signal, a source connected to the drain of the first transistor, and a drain connected to the anode of the organic light emitting diode; and a seventh transistor comprising a gate electrode configured to receive the initialization signal, a source connected to the anode of the organic light emitting diode, and a drain connected to the line of the initialization voltage.

16. An organic light emitting diode (OLED) display device comprising:

a display panel comprising a plurality of pixels;

a data driver configured to provide data signals to the plurality of pixels;

a scan driver configured to provide scan signals and initialization signals to the plurality of pixels;

a power supply configured to provide a first power supply voltage, a second power supply voltage, and an initialization voltage to the plurality of pixels; and a controller configured to control the data driver, the scan driver, and the power supply, wherein each of the plurality of pixels comprises:

a storage capacitor comprising a first electrode connected to a line of the first power supply voltage, and a second electrode connected to a gate node;

a first transistor comprising a gate electrode connected to the gate node;

a second transistor configured to transfer a corresponding one of the data signals to a source of the first transistor in response to a corresponding one of the scan signals;

a third transistor configured to diode-connect the first transistor in response to the corresponding one of the scan signals, the third transistor comprising first and second sub-transistors that are serially connected between the gate node and a drain of the first transistor, the first and second sub-transistors comprising first and second active regions spaced from each other in a plan view, first and second gate electrodes overlapping with the first and second active regions, respectively, and a node of the third transistor between the first and second active regions of the first and second sub-transistors;

a fourth transistor configured to transfer the initialization voltage to the gate node in response to a corresponding one of the initialization signals, the fourth transistor comprising third and fourth sub-transistors that are serially connected between the gate node and a line of the initialization voltage, the third and fourth sub-transistors comprising third and fourth active regions spaced from each other in a plan view, third and fourth gate electrodes overlapping with the third and fourth active regions, respectively, and a node of the fourth transistor between the third and fourth active regions of the third and fourth sub-transistors; and an organic light emitting diode comprising an anode, and a cathode connected to a line of the second power supply voltage, wherein at least one of the second sub-transistor or the fourth sub-transistor comprises a bottom electrode to decrease a voltage of at least one of the node of the third transistor or the node of the fourth transistor in response to a bottom electrode voltage, wherein, in a plan view, the bottom electrode overlaps with at least one of the second gate electrode or the fourth gate electrode, while being spaced from the first gate electrode and the third gate electrode, wherein at least one of the second gate electrode or the fourth gate electrode is disposed over a corresponding one of the second active region and the fourth active region, and the bottom electrode is disposed under the corresponding one of the second active region and the fourth active region, wherein, in a plan view, an end of the bottom electrode overlaps with a space defined between the first and second gate electrodes or between the third and fourth gate electrodes, and wherein the bottom electrode is configured to receive the bottom electrode voltage during a masking period in which the display panel is not driven such that the display panel displays an image based on previously stored data signals of a previous frame period.

17. The OLED display device of claim 16, wherein the controller comprises:

a still image detector configured to receive input image data at an input frame frequency, and to determine whether the input image data represents a still image, and wherein, when the input image data represents the still image, the controller is configured to set at least one frame period as the masking period to drive the display panel at a driving frequency lower than the input frame frequency.

18. The OLED display device of claim 17, wherein the data driver is configured to not provide the data signals to the plurality of pixels during the masking period, wherein the scan driver is configured to not provide the scan signals to the plurality of pixels during the masking period, and wherein the power supply is configured to provide the bottom electrode voltage to the bottom electrode of each of the plurality of pixels during the masking period.

19. The OLED display device of claim 16, wherein the controller comprises:

a still image detector configured to receive input image data at an input frame frequency, to divide the input image data into a plurality of partial image data, and to determine whether each of the plurality of partial image data represents a still image, wherein, when at least one partial image data of the plurality of partial image data represents the still image, the controller is configured to set a portion of a frame period corresponding to a portion of the display panel as the masking period to drive the portion of the display panel corresponding to the at least one partial image data at a driving frequency lower than the input frame frequency, and wherein the power supply is configured to provide the bottom electrode voltage to the bottom electrode of each of the plurality of pixels during the masking period.

20. The OLED display device of claim 16, wherein the display panel comprises a plurality of regions, and wherein the power supply is configured to provide different bottom electrode voltages to the plurality of regions during the masking period.

* * * * *